(12) United States Patent
Wang

(10) Patent No.: US 8,893,272 B2
(45) Date of Patent: Nov. 18, 2014

(54) METHOD AND DEVICE FOR RECOMBINING RUNTIME INSTRUCTION

(75) Inventor: Jiaxiang Wang, Beijing (CN)

(73) Assignee: Beijing Zhongtian Antai Technology Co., Ltd., Beijing (CN)

( * ) Notice: Subject to any disclaimer, the term of this patent is extended or adjusted under 35 U.S.C. 154(b) by 0 days.

(21) Appl. No.: 14/113,570

(22) PCT Filed: Apr. 29, 2011

(86) PCT No.: PCT/CN2011/073495
§ 371 (c)(1),
(2), (4) Date: Oct. 23, 2013

(87) PCT Pub. No.: WO2012/145917
PCT Pub. Date: Nov. 1, 2012

(65) Prior Publication Data
US 2014/0047222 A1    Feb. 13, 2014

(51) Int. Cl.
G06F 21/00 (2013.01)
G06F 21/52 (2013.01)
G06F 21/56 (2013.01)

(52) U.S. Cl.
CPC .............. *G06F 21/52* (2013.01); *G06F 21/566* (2013.01)
USPC .......................................................... 726/22

(58) Field of Classification Search
None
See application file for complete search history.

(56) References Cited

U.S. PATENT DOCUMENTS 7,287,166 B1 * 10/2007 Chang et al. .................. 713/187
7,328,453 B2 * 2/2008 Merkle et al. .................. 726/23
7,526,805 B2 * 4/2009 Chu et al. ........................ 726/22
7,620,987 B2 * 11/2009 Shelest et al. ................... 726/22
7,886,287 B1 2/2011 Davda (Continued)

FOREIGN PATENT DOCUMENTS

| CN | 1373402 A | 10/2002 |
| CN | 1475909 A | 2/2004 |
| CN | 101004702 A | 7/2007 |
| CN | 101082886 A | 12/2007 |

OTHER PUBLICATIONS

International Search Report dated Feb. 23, 2012 from corresponding International Application No. PCT/CN2011/073495.
International Search Report dated Feb. 9, 2012 from potentially related International Application No. PCT/CN2011/073492.
International Search Report dated Dec. 29, 2011 from potentially related International Application No. PCT/CN2011/073493.

(Continued)

*Primary Examiner* — Benjamin Lanier
(74) *Attorney, Agent, or Firm* — Wolf, Greenfield & Sacks, P.C.

(57) ABSTRACT

A method for recombining runtime instruction comprising: an instruction running environment is buffered; the machine instruction segment to be scheduled is obtained; the second jump instruction which directs an entry address of an instruction recombining platform is inserted before the last instruction of the obtained machine instruction segment to generate the recombined instruction segment comprising the address A"; the value A of the address register of the buffered instruction running environment is modified to the address A"; the instruction running environment is recovered. A device for recombining the runtime instruction comprising: an instruction running environment buffering and recovering unit suitable for buffering and recovering the instruction running environment; an instruction obtaining unit suitable for obtaining the machine instruction segment to be scheduled; an instruction recombining unit suitable for generating the recombined instruction segment comprised the address A"; and an instruction replacing unit suitable for modifying the value of the address register of the buffered instruction running environment to the address of the recombined instruction segment. The monitoring and control of the runtime instruction of the computing device is completed.

17 Claims, 15 Drawing Sheets

(56) References Cited

U.S. PATENT DOCUMENTS

| | | | |
|---|---|---|---|
| 7,945,958 B2* | 5/2011 | Amarasinghe et al. | 726/25 |
| 8,266,423 B2* | 9/2012 | Giraud et al. | 713/152 |
| 2008/0127338 A1 | 5/2008 | Cho et al. | |
| 2009/0328185 A1* | 12/2009 | Berg et al. | 726/13 |

OTHER PUBLICATIONS

Written Opinion of the International Search Authority dated Jan. 11, 2012 from corresponding International Application No. PCT/CN2011/073495.

* cited by examiner

METHOD AND DEVICE FOR RECOMBINING RUNTIME INSTRUCTION

FIELD OF THE DISCLOSURE

The present disclosure is related to instruction processing in a computing device, and more particularly, to a runtime instruction recombination method and device.

BACKGROUND OF THE DISCLOSURE

The running of a computer is a process that software directs and controls hardware to generate results. However, during the running of a computer, because of program bugs, system backdoors, system vulnerability, malicious codes, etc., users may get partially or totally unexpected results.

To solve this problem, there are provided many methods nowadays, such as static code analysis, vulnerability detection, setting up a malicious code list (i.e., anti-virus software). However, the static code analysis can only determine the correctness of logics and parameter definitions, which is syntax analysis; vulnerability detection is to try a variety of logic assumptions to find logical vulnerability, which is also based on static analysis; and setting up a malicious code list can only solve limited problems as is well-known.

The above methods cannot fully solve existing problems, for they do not analyze runtime instructions.

Therefore, there is a need for a method which can monitor runtime instructions in a computing device.

SUMMARY

Embodiments of the present disclosure provide a runtime instruction recombination method and device, so as to monitor and control runtime instructions in a computing device.

According to one aspect of the present disclosure, there is provided a runtime instruction recombination method, including:

storing an instruction execution context;

acquiring a machine instruction segment to be scheduled; inserting a second control transfer instruction before the last instruction of the acquired machine instruction segment to be scheduled, the second control transfer instruction pointing to an entry address of an instruction recombination platform, which generates a recombined instruction segment with address A"; modifying value A of an address register in the stored instruction execution context to the address A" of the recombined instruction segment; and restoring the instruction execution context, wherein the address register's value is updated.

Optionally, acquiring a machine instruction segment to be scheduled includes: reading an address of a machine instruction to be scheduled from a CPU address register; and reading a machine instruction segment according to the address of a machine instruction to be scheduled, the last instruction of the machine instruction segment being a control transfer instruction.

Optionally, reading a machine instruction segment according to the address of a machine instruction to be scheduled includes: searching machine instructions corresponding to the address of the machine instruction to be scheduled, until a first control transfer instruction is found; wherein the control transfer instruction includes JMP instruction and CALL instruction.

Optionally, after storing an instruction execution context and before acquiring a machine instruction segment to be scheduled, the method further includes:

searching an address corresponding table according to the value A of the address register; the address corresponding table being used to show whether or not the machine instruction segment to be recombined has a stored recombined instruction segment with address A';

if a record in the address corresponding table is found, modifying the value A of the address register to the value A' of the record, and restoring the instruction execution context. The address register's value is updated.

Optionally, the runtime instruction recombination method further includes: creating a record in the address corresponding table with the address A" of the recombined instruction segment and the value A of the address register.

Optionally, before inserting a second control transfer instruction, the method further includes: analyzing the machine instruction segment by using an instruction set to identify the machine instruction segment, in order to acquire a target machine instruction to be processed; and modifying the target machine instruction in a preset way. The instruction set can be X86 instruction set, MIPS instruction set, ARM instruction set, etc.

Optionally, the target machine instruction is a store or read instruction; and modifying the target machine instruction in a preset way includes: modifying a store or read address of the store or read instruction to a corresponding address on a safety device.

Optionally, the target machine instruction is an I/O instruction; and modifying the target machine instruction in a preset way includes: blocking all input instructions in the I/O instruction.

Optionally, the target machine instruction is a network transmission instruction; and modifying the target machine instruction in a preset way includes: determining if a destination address of the network transmission instruction which corresponds to a remote computing device is a permitted address; and blocking the network transmission instruction if the destination address is not a permitted address.

According to another aspect of the present disclosure, there is provided a runtime instruction recombination method, including:

storing an instruction execution context;

acquiring a machine instruction segment to be scheduled; disassembling the machine instruction segment into an assembly instruction segment;

inserting a second control transfer instruction before the last instruction of the assembly instruction segment, which generates a recombined assembly instruction segment with address A", the second control transfer instruction pointing to an entry address of an instruction recombination platform;

assembling the recombined assembly instruction segment to get a recombined machine instruction segment; modifying value of an address register in the stored instruction execution context to the address of the recombined assembly instruction segment; and restoring the instruction execution context, wherein the address register has been updated.

Further, according to still another aspect of the present disclosure, there is provided a non-transitory computer readable medium, storing a computer program for causing a computer to execute instructions according to one of above methods.

Further, according to still another aspect of the present disclosure, there is provided a runtime instruction recombination device, including: an instruction execution context store and restore unit, being adapted to store and restore an instruction execution context; an instruction acquiring unit, being adapted to acquire a machine instruction segment to be scheduled after the instruction execution context store and restore unit stores the instruction execution context; an instruction recombination unit, being adapted to analyze and modify the machine instruction segment to be scheduled, to generate a recombined instruction segment with address A"; and an instruction replacing unit, being adapted to modify value of an address register in the stored instruction execution context to the address of the recombined instruction segment.

Optionally, the instruction acquiring unit is adapted to read an address of a machine instruction to be scheduled from a CPU address register, and to read the machine instruction segment according to the address of the machine instruction, the last instruction of the machine instruction segment being a control transfer instruction.

Optionally, the runtime instruction recombination device further includes: an instruction searching unit, being adapted to search an address corresponding table with the value A of the address register in the stored instruction execution context; the address corresponding table being used to show whether or not the machine instruction segment to be recombined has a stored recombined instruction segment which has address A'; if a record in the address corresponding table is found, the instruction searching unit being adapted to call the instruction replacing unit to modify the value A of the address register to the value A' of the record; if no record in the address corresponding table is found, the instruction searching unit being adapted to create a record in the address corresponding table using the address A" of the recombined instruction segment and the value A of the address register.

Optionally, the instruction recombination unit includes: an instruction analysis unit, being adapted to identify the machine instruction segment by using an instruction set and to acquire a target machine instruction that is to be processed; and an instruction modification unit, being adapted to modify the target machine instruction in a preset way. The instruction set includes X86 instruction set, MIPS instruction set and ARM instruction set.

Optionally, if the target machine instruction is a store or read instruction, the instruction modification unit is adapted to modify a store or read address of the store or read instruction to a corresponding address on a safety device.

Optionally, if the target machine instruction is an I/O instruction, the instruction modification unit is adapted to block all input instructions in the I/O instruction.

Optionally, if the target machine instruction is a network transmission instruction, the instruction modification unit is adapted to determine if a destination address of the network transmission instruction which corresponds to a remote computing device is a permitted address; and if the destination address is not a permitted address, the instruction modification unit is adapted to block the network transmission instruction.

Optionally, the instruction recombination unit further includes: a disassembling unit, being adapted to disassemble the machine instruction segment to be scheduled before analyzing and modifying the machine instruction segment, which generates an assembly instruction segment to be scheduled; and an assembling unit, being adapted to assemble the recombined assembly instruction segment after analyzing and modifying the instruction segment, which generates recombined machine instruction segment.

Compared with the conventional art, the methods and devices provided in embodiments of the present disclosure have the following advantages:

(1) Instructions of a computing device may be monitored at runtime with the runtime instruction recombination method;

(2) Instruction recombination efficiency may be improved and computing resource (e.g., CPU) of a computing device may be saved by using address corresponding table;

(3) As for store and read instructions, data dump may be achieved by modifying the destination and source address in store and read instructions, which saves data onto a safety device to guarantee data security;

(4) As for I/O instructions, all input instructions of the I/O instruction can be blocked, which prevents the local hardware from write operation; and all input instructions except store instruction can be blocked, which may improve the data security in a computing device;

(5) As for network transmission instructions, data safety transmission is achieved by determining if a destination address of the network transmission instruction which corresponds to a remote computing device is a permitted address and blocking the network transmission instruction if the destination address is not.

DETAILED DESCRIPTION OF THE DISCLOSURE

In order to make those skilled in the art better understand the spirit of the disclosure, embodiments according to the disclosure will be illustrated in detail hereinafter in conjunction with drawings.

The following embodiments are only specific embodiments of the disclosure which are used to make those skilled in the art better understand the spirit of the disclosure, however, the scope of protection of the disclosure should not be limited to the specific descriptions of the specific embodiments, various modifications can be made to the specific embodiments of the disclosure by those skilled in the art without departing from the scope of spirit of the disclosure.

When a computer is running, a CPU address register keeps the address of a next machine instruction that is to be executed. To realize monitoring of runtime machine instructions, in some embodiments of the present disclosure, data of this register is acquired, one or more machine instructions to be executed are read according to the data of the register, and the instruction segment to be scheduled which is composed of the one or more machine instructions is modified, thus the control right may be acquired before each machine instruction is executed and analysis of the following instructions may be performed continuously. Further, in some embodiments of the present disclosure, after the step of acquiring the machine instruction segment to be scheduled, steps of processing target instructions in the machine instruction segment to be scheduled are performed, therefore, not only are the runtime instructions recombined and monitored, but also target instructions are modified and updated.

Figure 1:
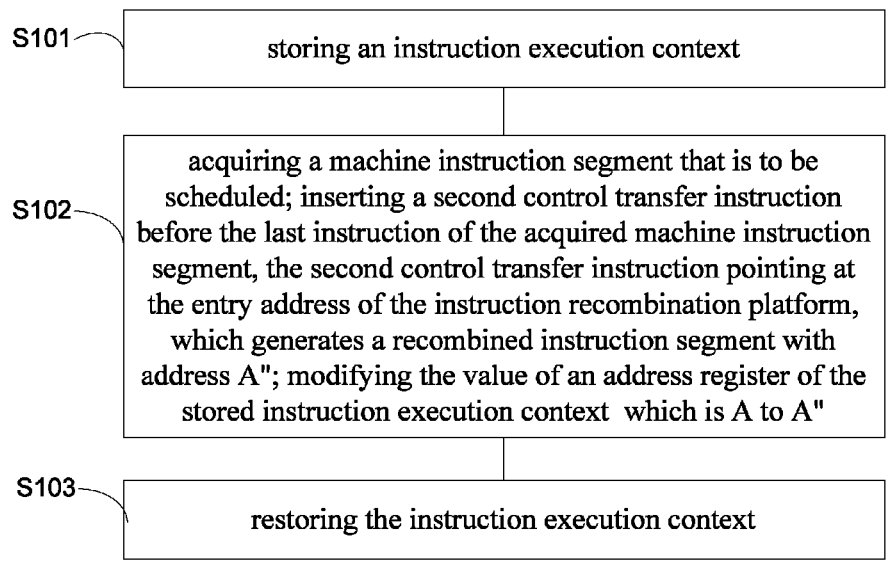
FIG. 1 is a flowchart of a runtime instruction recombination method provided in a first embodiment of the present disclosure.

According to a first embodiment of the present disclosure, there is provided a runtime instruction recombination method. As illustrated in FIG. 1, the method includes:

S101, storing an instruction execution context;

S102, acquiring a machine instruction segment that is to be scheduled; inserting a second control transfer instruction before the last instruction of the acquired machine instruction segment, the second control transfer instruction pointing at an entry address of an instruction recombination platform, which generates a recombined instruction segment with address A"; and modifying the value of an address register of the stored instruction execution context which is A to A"; and S103, restoring the instruction execution context.

Specifically, before the step S101 is performed, the method further includes a step to acquire the control right to run on CPU. When CPU performs this method, the method firstly stores the instruction execution context (i.e. step S101), that is to say, it stores the result of the monitored instruction which has just been executed. The CPU used in this embodiment is a central processing unit of X86-architecture; it may also be MIPS processor or processor of ARM architecture in other embodiments of the present disclosure. And one of ordinary skill in the art can appreciate that the CPU can be an instruction processing unit in computing devices of any other type.

In step S101, the step of storing the instruction execution context includes:

pushing register data that is related to instruction execution onto a stack, which includes data of registers such as the CPU address register. In other embodiments of the present disclosure, the instruction execution context can also be stored at other default or specified places or with other default or specified data structures.

In step S102, acquiring the machine instruction segment that is to be scheduled includes:

S1021, reading an address of the machine instruction to be scheduled from a CPU address register;

S1022, by using a control transfer instruction as the search target, searching machine instructions corresponding to the address of the machine instruction, until the first control transfer instruction is found, the control transfer instruction including JMP instruction and CALL instruction;

S1023, defining the first control transfer instruction and machine instructions before the first control transfer instruction as a machine instruction segment to be scheduled; and storing the machine instruction segment in the instruction recombination platform or other storage locations that the instruction recombination platform is able to access.

In other embodiments of the present disclosure, acquiring the machine instruction segment that is to be scheduled can also use non-control transfer instructions such as write instruction or read instruction as search target, to divide machine instructions into machine instruction segments. And since it needs to guarantee that the instruction recombination platform gets the control right of the CPU (i.e. the control right to run on CPU) after a control transfer instruction in a machine instruction segment is executed, control transfer instructions need to be used as a supplemental or secondary search target, thereby resulting in machine instruction segments in smaller size.

Still in step S102, before inserting a second control transfer instruction JP2, the method provided in this embodiment can further include:

S1025, analyzing the machine instruction segment by using an instruction set to identify the machine instruction segment, in order to acquire a target machine instruction to be processed; the instruction set can be X86, MIPS, or ARM instruction set;

S1026, modifying the target machine instruction in a preset way.

With the above steps, runtime instruction monitoring can be realized, and other processes can be performed as well, which will be further discussed in the following embodiment.

Since the purpose of this embodiment is to realize runtime instruction recombination, steps S1025 and S1026 are not performed, and the following steps are directly performed as follows: inserting a second control transfer instruction JP2 before the last instruction (which is a control transfer instruction JP1) of the acquired machine instruction segment, the second control transfer instruction JP2 pointing at the entry address of the instruction recombination platform, which generates a recombined instruction segment with address A"; modifying the value A of the address register (i.e. the CPU address register) of the stored instruction execution context to A". The instruction recombination platform is the execution platform of the instruction recombination method provided in this embodiment.

Inserting JP2 is to rerun the instruction recombination platform before JP1 when the CPU executes the machine instruction segment that is to be scheduled; then, the instruction recombination platform continues to analyze the next machine instruction segment to be scheduled, and repeats the steps in the above method to finish the recombination for all instructions. More details are to be discussed in the following analysis of step S103.

In step S103, restoring the instruction execution context includes: popping the register data related with the instruction execution from the stack, wherein the destination address of the control transfer instruction which is stored in the address register has already been modified to A" which is the entry address of the new machine instruction segment. After restoring the instruction execution context, the instruction recombination platform finishes operation this time; the CPU continues to perform the last instruction (which is a control transfer instruction) of the previous machine instruction segment, which destination address has been modified to A" as discussed above; the CPU performs the new machine instruction segment with the entry address of A". When the instruction segment with entry address of A" is performed to the penultimate instruction (which is the second control transfer instruction JP2), the instruction recombination platform gets the control right to run on the CPU again, and the instruction recombination platform repeats the process from step S101 to step S103.

Figure 2:
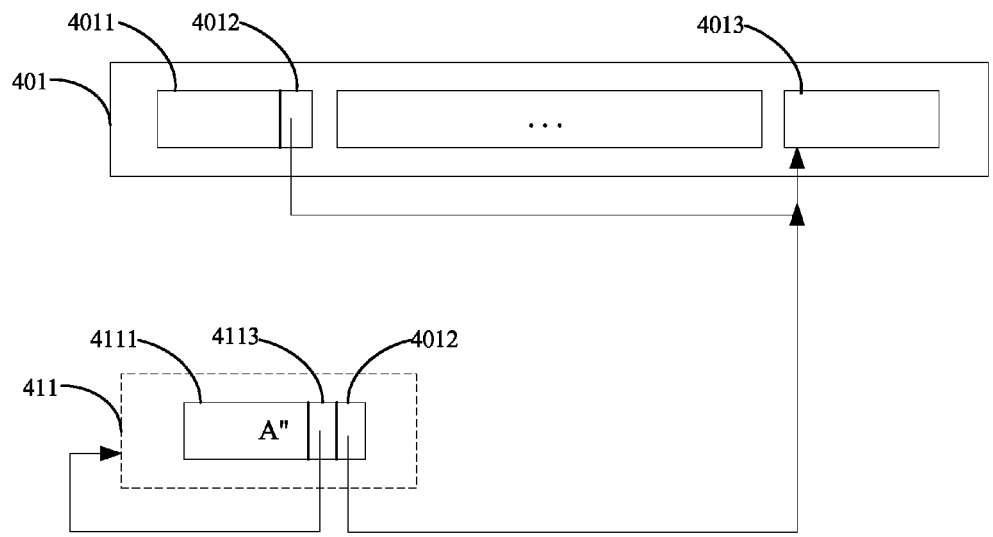
FIG. 2 is a schematic view showing an instruction recombination process and a recombined instruction segment in the first embodiment of the present disclosure.

Referring to FIG. 2, the instruction recombination process and the generation of a recombined instruction segment will be discussed in detail. A machine instruction set 401 that is to be scheduled is shown in FIG. 2, wherein the first control transfer instruction is a first control transfer instruction 4012; before the instructions prior to the instruction 4012 is executed, destination address of the instruction 4012 is unknown if it is an variable, therefore, it assumes that the first control transfer instruction 4012 points to a machine instruction 4013; machine instructions including the first control transfer instruction 4012 and instructions prior to the instruction 4012 constitute a machine instruction segment 4011.

Still referring to FIG. 2, when an instruction recombination platform 411 runs, first the instruction execution context is stored; then the machine instruction segment 4011 is acquired; the instruction recombination platform inserts a second control transfer instruction 4113 before the first control transfer instruction 4012, the second control transfer instruction 4113 pointing to the instruction recombination platform 411 itself, which generates a recombined instruction segment 4111 having an address of A"; then the value A of the address register in the stored instruction execution context is modified to A"; at last, the instruction execution context is restored.

After the instruction recombination platform 411 finishes running, CPU continues to execute the last control transfer instruction of the previous recombined instruction segment, which has an address register's value of A". After the recombined instruction segment with an address of A" starts, when the second control transfer instruction 4113 is running, the instruction recombination platform 411 acquires the control right of the CPU again, and then continues to analyze the machine instructions to be scheduled, thus the method of runtime instruction recombination is finished.

Figure 3:
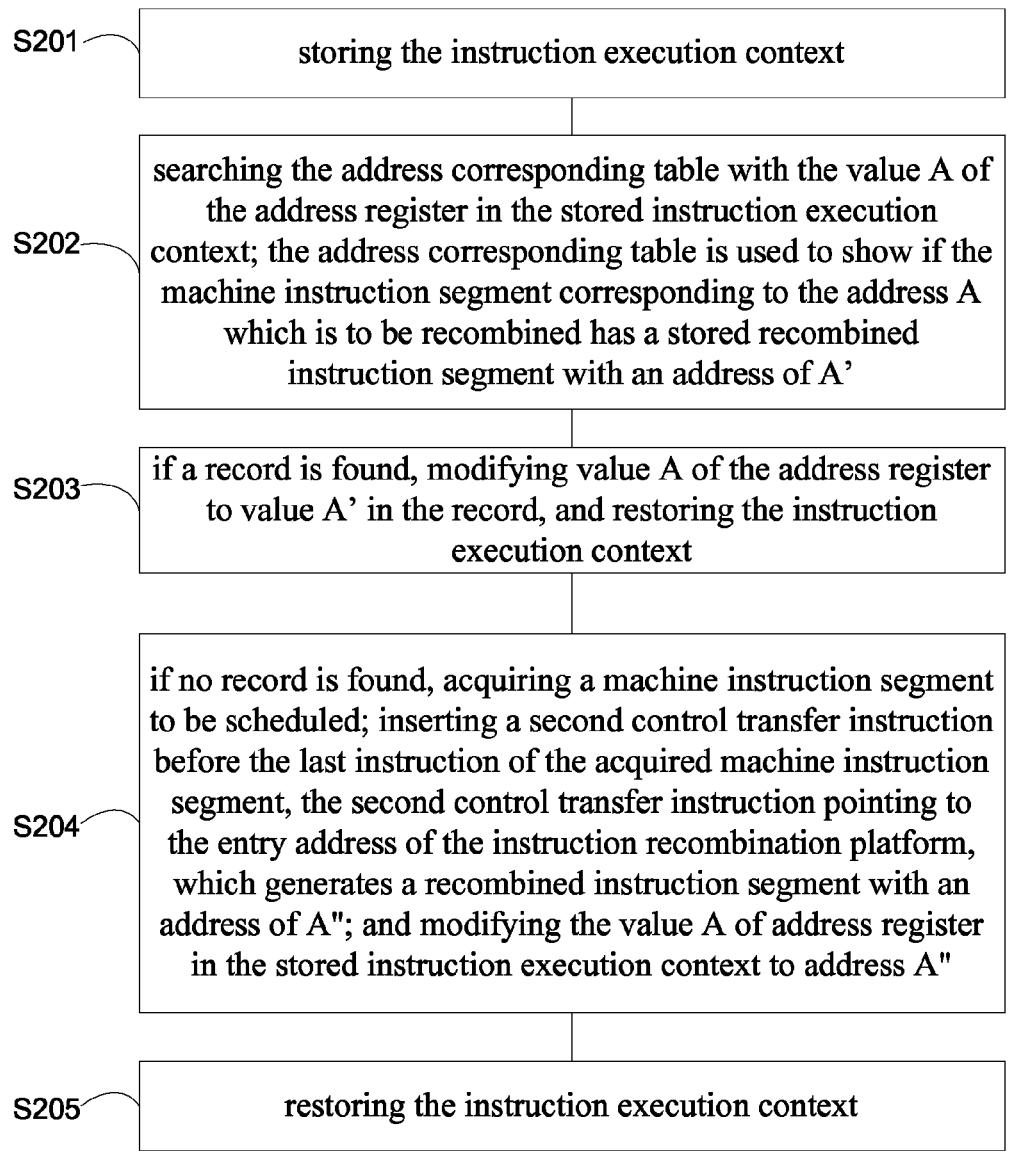
FIG. 3 is a flowchart of a runtime instruction recombination method provided in a second embodiment of the present disclosure.

Further, machine instructions of an executed program have high repeatability; to improve instruction recombination efficiency and save computing resource (e.g., CPU) of the computing device, according to a second embodiment of the present disclosure, there is provided a runtime instruction recombination method as shown in FIG. 3. The runtime instruction recombination method includes:

S201, storing the instruction execution context;
S202, searching an address corresponding table with the value A of the address register in the stored instruction execution context; the address corresponding table is used to show if the machine instruction segment corresponding to the address A which is to be recombined has a stored recombined instruction segment with an address of A';

S203, if a record is found, modifying value A of the address register to value A' of the record, and restoring the instruction execution context; the method is finished this time;

S204, if no record is found, acquiring a machine instruction segment to be scheduled; inserting a second control transfer instruction before the last instruction of the acquired machine instruction segment, the second control transfer instruction pointing to the entry address of the instruction recombination platform, which generates a recombined instruction segment with an address of A"; and modifying the value A of address register in the stored instruction execution context to address A";

S205, restoring the instruction execution context.

Also, the step S204 may further include: creating a record in the address corresponding table using the address A" and address A. And the recombined instruction segment with address A" is stored in the instruction recombination platform for reuse.

By using the address corresponding table, the method saves the computing resources and improves efficiency of runtime instruction recombination.

In the above embodiments, machine instructions, i.e. binary machine codes, are directly manipulated or handled; in other embodiments of the present disclosure, since there may be further operations like instruction modifications, the machine instruction segment to be scheduled can be firstly disassembled into assembly code segment for later use, and the assembly code segment is to be assembled into binary machine code before restoring the instruction execution context.

Figure 4:
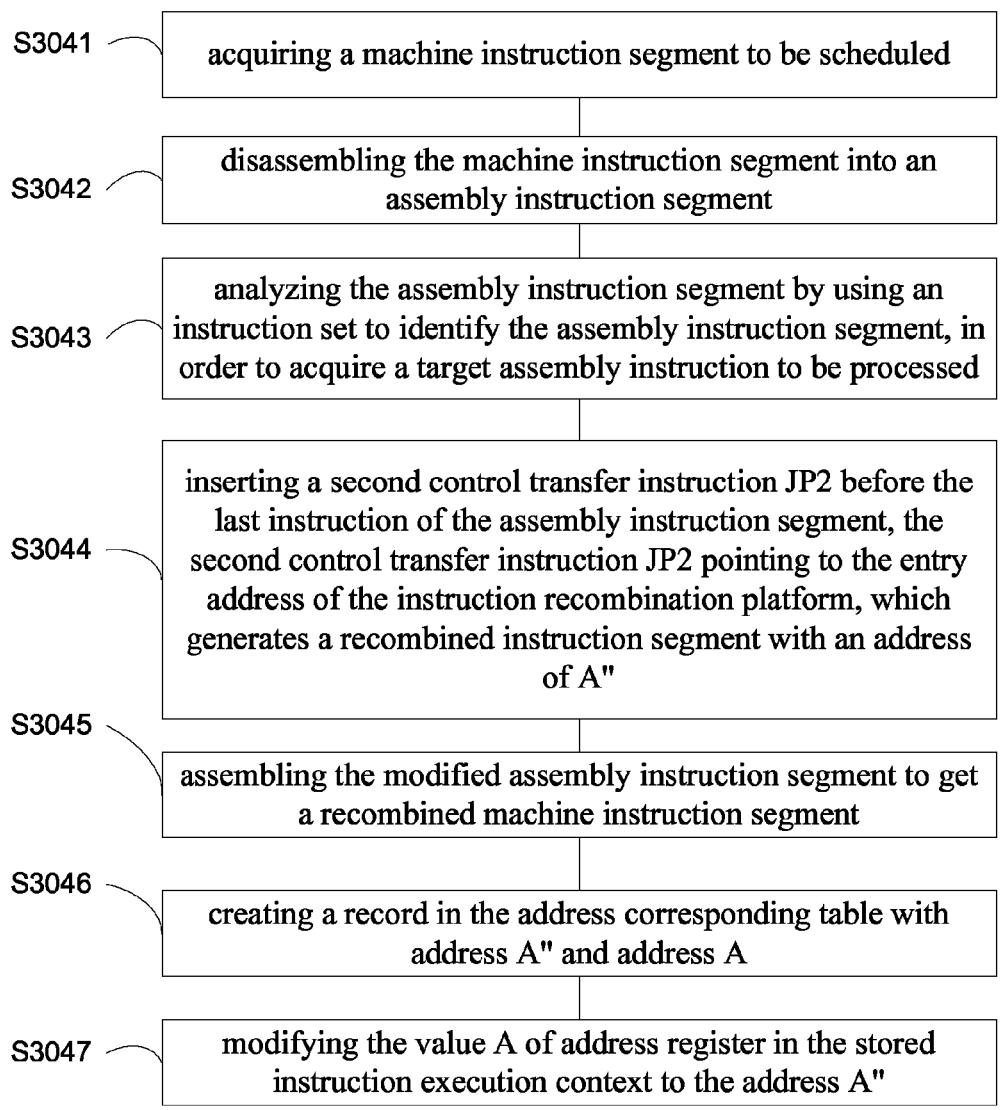
FIG. 4 is a flowchart of a runtime instruction recombination method provided in a third embodiment of the present disclosure.

According to a third embodiment of the present disclosure, there is provided a runtime instruction recombination method, including:

S301, storing a current instruction execution context;
S302, searching an address corresponding table with a value A of an address register in the stored instruction execution context;
S303, if a corresponding record is found, modifying value A of the address register to value A' of the record, and restoring the instruction execution context;
S304, if no record is found, a generating method of recombined instruction is shown in FIG. 4, including:
S3041, acquiring a machine instruction segment to be scheduled;
S3042, disassembling the machine instruction segment into an assembly instruction segment;
S3043, analyzing the assembly instruction segment by using an instruction set to identify the assembly instruction segment, so as to acquire a target assembly instruction to be processed;
S3044, inserting a second control transfer instruction JP2 before the last instruction of the assembly instruction segment, the second control transfer instruction JP2 pointing to an entry address of the instruction recombination platform, which generates a recombined instruction segment with an address of A";
S3045, assembling the modified assembly instruction segment to get a recombined machine instruction segment;
S3046, creating a record in the address corresponding table with the address A" and address A;
S3047, modifying the value A of address register in the stored instruction execution context to the address A";
S305, restoring the instruction execution context.

Step S3042 and S3045 are corresponding disassembling and assembling steps. It's easy to perform further analyzing and modifying steps after the machine instruction segment is disassembled into assembly instruction segment. Other steps are similar with those in the above embodiment, which will not be discussed again.

The above runtime instruction recombination method provides basis for further applications. The following embodiments provide various runtime instruction recombination methods which perform different processing on machine instructions including store/read instruction, I/O instruction and network transmission instruction.

For a store/read instruction, according to a fourth embodiment of the present disclosure, there is provided a runtime instruction recombination method, including:

S401, storing a current instruction execution context;

S402, searching an address corresponding table with value A of an address register in the stored instruction execution context;

S403, if a corresponding record is found, modifying the value A of the address register to value A' of the record, and restoring the instruction execution context;

S404, if no record is found, a generating method of a recombined instruction includes:

S4041, acquiring a machine instruction segment to be scheduled;

S4042, disassembling the machine instruction segment into an assembly instruction segment;

S4043, analyzing the assembly instruction segment by using an instruction set to identify the assembly instruction segment, so as to acquire a target assembly instruction to be processed; the target assembly instruction being a store/read instruction;

S4044, if the assembly instruction segment includes a store/read instruction, modifying a store or read address of the store/read instruction to corresponding addresses on a safety device;

S4045, inserting a second control transfer instruction JP2 before the last instruction of the assembly instruction segment, the second control transfer instruction JP2 pointing to an entry address of the instruction recombination platform, which generates a recombined instruction segment with an address of A";

S4046, assembling the modified assembly instruction segment to get a recombined machine instruction segment;

S4047, creating a record in the address corresponding table with the address A" and address A;

S4048, modifying the value A of the address register in the stored instruction execution context to the address A";

S405, restoring the instruction execution context.

In this embodiment, the target instruction is processed after the disassembling step; in other embodiments, target instructions may be processed directly by omitting the assembling and disassembling steps.

In step S4044, for store and read instructions, the target or source address in the store or read instruction is modified to achieve data dump, which is to save data onto a safety device for data security. More details will be discussed in the following embodiments of the present disclosure.

For an I/O instruction, according to a fifth embodiment of the present disclosure, there is provided a runtime instruction recombination method, including:

S501, storing a current instruction execution context;

S502, searching an address corresponding table with value A of an address register in the stored instruction execution context;

S503, if a corresponding record is found, modifying value A of the address register to value A' of the record, and restoring the instruction execution context;

S504, if no record is found, a generating method of a recombined instruction includes:

S5041, acquiring a machine instruction segment to be scheduled;

S5042, disassembling the machine instruction segment into an assembly instruction segment;

S5043, analyzing the assembly instruction segment by using an instruction set to identify the assembly instruction segment, so as to acquire a target assembly instruction to be processed; the target assembly instruction being a I/O instruction;

S5044, if the assembly instruction segment includes an I/O instruction, blocking all input instructions in the I/O instruction;

S5045, inserting a second control transfer instruction JP2 before the last instruction of the assembly instruction segment, the second control transfer instruction JP2 pointing to an entry address of the instruction recombination platform, which generates a recombined instruction segment with an address of A";

S5046, assembling the modified assembly instruction segment to get a recombined machine instruction segment;

S5047, creating a record in the address corresponding table with the address A" and address A;

S5048, modifying the value A of the address register in the stored instruction execution context to the address A";

S505, restoring the instruction execution context.

In this embodiment, the target instruction is processed after the disassembling step; in other embodiments, target instructions may be processed directly by omitting the assembling and disassembling steps.

In the step S5044, all input instructions in the I/O instruction are blocked, to prevent a local hardware from writing operation; together with the process of store instruction in the last embodiment, all input instructions except store instruction can be blocked, which can improve the data security in computing device.

For a network transmission instruction, according to a sixth embodiment of the present disclosure, there is provided a runtime instruction recombination method including:

S601, storing a current instruction execution context;

S602, searching an address corresponding table with value A of an address register in the stored instruction execution context;

S603, if a corresponding record is found, modifying the value A of the address register to value A' of the record, and restoring the instruction execution context;

S604, if no record is found, a generating method of a recombined instruction includes:

S6041, acquiring a machine instruction segment to be scheduled;

S6042, disassembling the machine instruction segment into an assembly instruction segment;

S6043, analyzing the assembly instruction segment by using an instruction set to identify the assembly instruction segment, so as to acquire a target assembly instruction to be processed; the target assembly instruction being a network transmission instruction;

S6044, if the assembly instruction segment includes a network transmission instruction, determining if a destination address of the network transmission instruction which corresponds to a remote computing device is a permitted address; and if the destination address is not a permitted address, blocking the network transmission instruction;

S6045, inserting a second control transfer instruction JP2 before the last instruction of the assembly instruction segment, the second control transfer instruction JP2 pointing to an entry address of the instruction recombination platform, which generates a recombined instruction segment with an address of A";

S6046, assembling the modified assembly instruction segment to get a recombined machine instruction segment;

S6047, creating a record in the address corresponding table with the address A" and address A;

S6048, modifying the value A of the address register in the stored instruction execution context to the address A";

S605, restoring the instruction execution context.

In this embodiment, the target instruction is processed after the disassembling step; in other embodiments, target instructions may be processed directly by omitting the assembling and disassembling steps.

In step S6044, a network transmission instruction is processed to check if its destination address which corresponds to a remote computing device is a permitted address; if not, the network transmission instruction is blocked to realize secure data transmission.

The address corresponding table in the above embodiments are created and maintained by the instruction recombination platform, which may have a fixed-length array structure, a variable-length linked list structure, or other proper data structures for saving data pairs. Optionally, the length is adjustable and the space of the data structure can be released. The operation of releasing the space occupied by the address corresponding table may be performed periodically or in a random manner. In some embodiments, the address corresponding table further includes a data field saving the time for creating a record, which is used by the releasing operation to remove records according to the existence time. In some embodiments, the address corresponding table further includes a data field which is used as a usage counter; in the step of searching the address corresponding table, if a record is found, this field is updated or modified; and it is also used by the releasing operation to delete records according to the usage counter.

Further, in order to perform runtime instruction monitoring since the system startup and to achieve a full monitoring of the runtime instructions during operation stage of a computing device, according to another embodiment of the present disclosure, the load instruction which is used at the system startup is modified, and the instruction recombination platform provided in the present disclosure is called to perform the runtime instruction recombination method before the execution of the load instruction; since the jump address of the load instruction is a fixed known address, the instruction recombination platform may create the address corresponding table with a first record and create a first recombined instruction segment in advance.

Further, according to the present disclosure, there is also provided a computer readable medium storing a computer program for causing a computer to execute instructions according to runtime instruction recombination methods provided by the above embodiments.

According to another aspect and corresponding to the above runtime instruction recombination methods, there is provided a runtime instruction recombination device in a seventh embodiment of the present disclosure.

Figure 5:
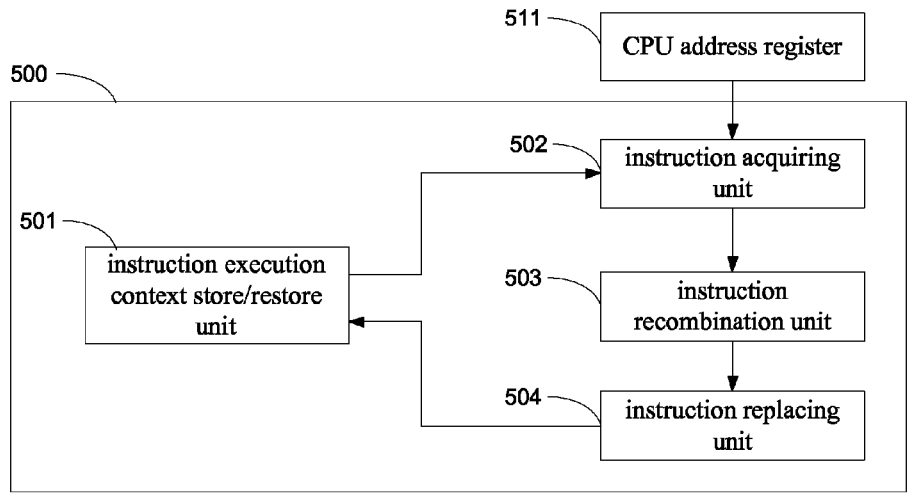
FIG. 5 is a schematic view showing a runtime instruction recombination device provided in a seventh embodiment of the present disclosure.

As illustrated in FIG. 5, the instruction recombination device 500 includes:

an instruction execution context store and restore unit 501, being adapted to store and restore an instruction execution context;

an instruction acquiring unit 502, being adapted to acquire a machine instruction segment to be scheduled, after the instruction execution context store and restore unit 501 stores the instruction execution context;

an instruction recombination unit 503, being adapted to analyze and modify the machine instruction segment to be scheduled and to generate a recombined instruction segment with address A"; and an instruction replacing unit 504, being adapted to modify value of the address register in the stored instruction execution context to an address of the recombined instruction segment.

The instruction execution context store and restore unit 501 is coupled to the instruction acquiring unit 502 and the instruction replacing unit 504; the instruction acquiring unit 502, instruction recombination unit 503 and instruction replacing unit 504 are coupled in turn, which means that the instruction acquiring unit 502 is coupled to the instruction recombination unit 503 and the instruction recombination unit 503 is coupled to the instruction replacing unit 504.

The instruction recombination device 500 performs the runtime instruction recombination method in the following way:

first, the instruction execution context store and restore unit 501 stores the instruction execution context, which is to push instruction-execution-related register data onto a stack (e.g. a stack in memory);

then, the instruction acquiring unit 502 reads the address of the machine instruction to be scheduled from a CPU address register, and reads a machine instruction segment according to the address, the last instruction of the machine instruction segment being a control transfer instruction. Specifically, the instruction acquiring unit 502 reads an address of the machine instruction to be scheduled from a CPU address register 511, searches the machine instructions corresponding to the address using control transfer instruction as the search target until a first control transfer instruction (e.g. the control transfer instruction includes JMP instruction and CALL instruction) is found, defines the first control transfer instruction and all machine instructions before it as a machine instruction segment to be scheduled, and stores the machine instruction segment in the instruction recombination device 500 or other storage locations which the instruction recombination device 500 can access;

then, the instruction recombination unit 503 inserts a second control transfer instruction before the last instruction of the acquired machine instruction segment, the second control transfer instruction pointing to an entry address of the instruction recombination device, which generates a recombined instruction segment with address A";

then, the instruction replacing unit 504 modifies the value A of the address register in the stored instruction execution context to the address A"; and finally, the instruction execution context store and restore unit 501 restores the instruction execution context, which is to pop instruction-execution-related register data from the stack.

Further, according to an eighth embodiment of the present disclosure, there is provided a runtime instruction recombination device, which utilizes repeatability of instructions in execution to improve the recombination efficiency and save computing resource of the computing device.

Figure 6:
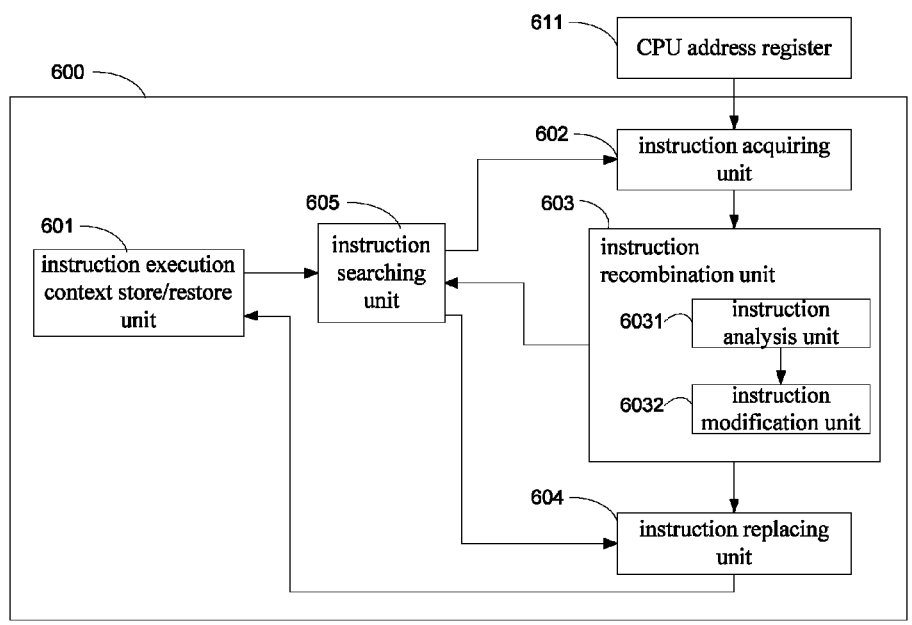
FIG. 6 is a schematic view showing a runtime instruction recombination device provided in an eighth embodiment of the present disclosure.

As shown in FIG. 6, the instruction recombination device 600 includes:

an instruction execution context store and restore unit 601, being adapted to store and restore instruction execution context;

an instruction acquiring unit 602, being adapted to acquire the machine instruction segment to be scheduled after the instruction execution context store and restore unit 601 stores the instruction execution context;

an instruction recombination unit 603, being adapted to analyze and modify the machine instruction segment to be scheduled, to generate a recombined instruction segment with address A";

an instruction replacing unit 604, being adapted to modify a value of an address register in the stored instruction execution context to the address of the recombined instruction segment; and an instruction searching unit 605, being adapted to search an address corresponding table using value A of the address register in the stored instruction execution context as a searching target; the address corresponding table being used to show if the machine instruction segment corresponding to the address A, which is to be recombined, has a stored recombined instruction segment with an address of A'; if a corresponding record is found, the instruction searching unit being adapted to call the instruction replacing unit to modify the value A of the address register to the value A' of the record; if no record is found, the instruction searching unit being further adapted to create a record in an address corresponding table with the address A and address A" of a recombined result.

The instruction execution context store and restore unit 601 is coupled to the instruction searching unit 605 and instruction replacing unit 604; the instruction searching unit 605 is coupled to the instruction acquiring unit 602, the instruction recombination unit 603 and the instruction replacing unit 604; and the instruction acquiring unit 602, instruction recombination unit 603 and the instruction replacing unit 604 are coupled in turn.

The instruction recombination device 600 performs the runtime instruction recombination method in the following way:

first, the instruction execution context store and restore unit 601 stores the instruction execution context, which is to push instruction-execution-related register data onto a stack;

then, the instruction searching unit 605 searches an address corresponding table using the value A of the address register in the stored instruction execution context as the searching target;

where if a record is found in the address corresponding table, the instruction searching unit 605 calls the instruction replacing unit 604, the instruction replacing unit 604 modifies the value A of the address register to the value A' of the record; and the instruction replacing unit 604 calls the instruction execution context store and restore unit 602 to restore the instruction execution context, i.e. to pop instruction-execution-related register data from the stack, and recombination process is finished; and if no record is found in the address corresponding table, the instruction searching unit 602 reads the address of the machine instruction to be scheduled from the CPU address register, and reads a machine instruction segment according to the address, the last instruction of the machine instruction segment being a control transfer instruction. In specific, the instruction acquiring unit 602 reads an address of the machine instruction to be scheduled from the CPU address register 611, searches the machine instructions corresponding to the address using control transfer instruction as the search target until a first control transfer instruction (e.g. the control transfer instruction includes JMP instruction and CALL instruction) is found, defines the first control transfer instruction and all machine instructions before it as a machine instruction segment to be scheduled, and stores the machine instruction segment in the instruction recombination device 600 or other storage locations which the instruction recombination device 600 can access;

then, the instruction recombination unit 603 inserts a second control transfer instruction before the last instruction of the acquired machine instruction segment, the second control transfer instruction pointing to an entry address of the instruction recombination device, which generates a recombined instruction segment with address A";

then, the instruction recombination unit 603 sends the address A" to instruction searching unit 605, and the instruction searching unit 605 creates a record in the address corresponding table with address A" and address A, which is for reuse in the future;

then, the instruction replacing unit 604 modifies the value A of the address register in the stored instruction execution context to the address A";

finally, the instruction execution context store and restore unit 601 restores the instruction execution context, which is to pop the instruction-execution-related register data from the stack.

In this embodiment, the instruction recombination unit 603 further includes:

an instruction analysis unit 6031, being adapted to use an instruction set to identify the machine instruction segment in order to acquire a target machine instruction that is to be processed; the instruction sets including X86, MIPS and ARM instruction set; and an instruction modification unit 6032, being adapted to modify or change the target machine instruction in a preset way.

If the target instruction is a store/read or save/read instruction, the instruction analysis unit 6031 is used to acquire the store/read instruction from the machine instruction segment to be scheduled, and the instruction modification unit 6032 is used to modify the store or read address in the store/read instruction to corresponding addresses on a safety device. The effect is the same as the above corresponding embodiments of methods.

If the target instruction is an I/O instruction, the instruction analysis unit 6031 is used to acquire the I/O instruction from the machine instruction segment to be scheduled, and the instruction modification unit 6032 is used to block all input instructions of the I/O instruction. The effect is the same as the above corresponding embodiments of methods.

If the target instruction is a network transmission instruction, the instruction analysis unit 6031 is used to acquire the network transmission instruction from the machine instruction segment to be scheduled, and the instruction modification unit 6032 is used to check if a destination address of the network transmission instruction which corresponds to a remote computing device is a permitted address. If the destination address is not a permitted address, the instruction modification unit is also used to block the network transmission instruction. The effect is the same as the above corresponding embodiments of methods.

Figure 7:
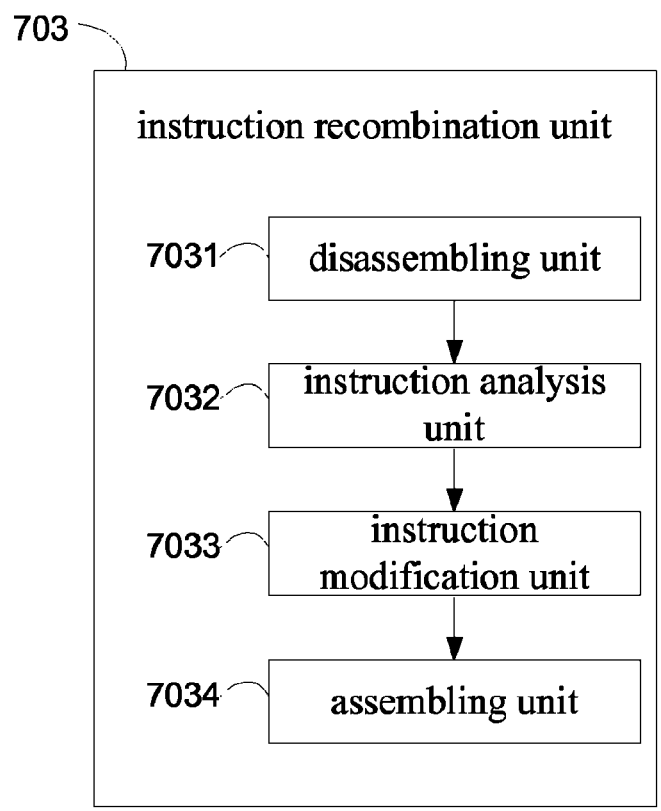
FIG. 7 is a schematic view showing an instruction recombination unit of a runtime instruction recombination device provided in a ninth embodiment of the present disclosure.

According to a ninth embodiment of the present disclosure, as shown in FIG. 7, the instruction recombination unit 703 further includes a disassembling unit 7031 and an assembling unit 7034. The disassembling unit 7031, an instruction analysis unit 7032, an instruction modification unit 7033 and the assembling unit 7034 are coupled in turn. Other units in this embodiment are the same as those in the eighth embodiment of the present disclosure.

The disassembling unit 7031 is adapted to disassemble the machine instruction segment to be scheduled before analyzing and modifying the instruction segment, which generates an assembly instruction segment to be scheduled; and is adapted to send the assembly instruction segment to the instruction analysis unit 7032.

The assembling unit 7034 is adapted to assemble the recombined assembly instruction segment after analyzing and modifying the instruction segment, which generates a recombined machine instruction segment; and is adapted to send the recombined instruction segment in machine code to the instruction replacing unit.

In this embodiment, the instruction analysis unit 7032 and instruction modification unit 7033 is to handle the assembly instruction segment to be scheduled in the same way as described in previous embodiments.

In the above embodiments, the runtime instruction recombination method and device provided in embodiments of the present disclosure are described in detail; compared with the prior art, there are advantageous including:

(1) instructions executed in a computing device are monitored by the instruction recombination method;

(2) instruction recombination efficiency is improved and computing resource can be saved by the address corresponding table;

(3) for store and read instructions, data dump is achieved by modifying the destination and source address in store and read instructions, which save data onto a safety device to guarantee data security;

(4) for I/O instructions, all input instructions in I/O instruction can be blocked, which prevents the local hardware from write operation; and all input instructions except store instruction can be blocked, which can improve the data security in a computing device;

(5) for network transmission instructions, by determining if a destination address of the network transmission instruction which corresponds to a remote computing device is a permitted address and by blocking the network transmission instruction if the destination address is not, it achieves data safety transmission.

For target instruction that is store/read instruction, there will be more embodiments below; and in these embodiment, there are provided a data safety storage and reading method as well as a data safety storage and reading device.

As described in the background, when a computing device such as a computer or a smart phone is invaded by malicious codes, the malicious codes can obtain data from the computing device. After obtaining data, the behavior model of malicious codes includes: (1) storage action: to store the target data in a certain storage location; (2) transmission action: to transmit the stolen data directly to a designated destination address through internet. In addition, the behavior model of divulging secrets by the personnel who use the above computing device includes: (1) actively divulging secrets: secret-related personnel directly acquires confidential information by active copy, malicious tools which penetrate safety system, or Trojan horses; (2) passively divulging secrets: computing devices or storage medium used by secret-related personnel are lost or misused such as directly connecting a secret-related device to the Internet which divulges secrets.

Figure 8:
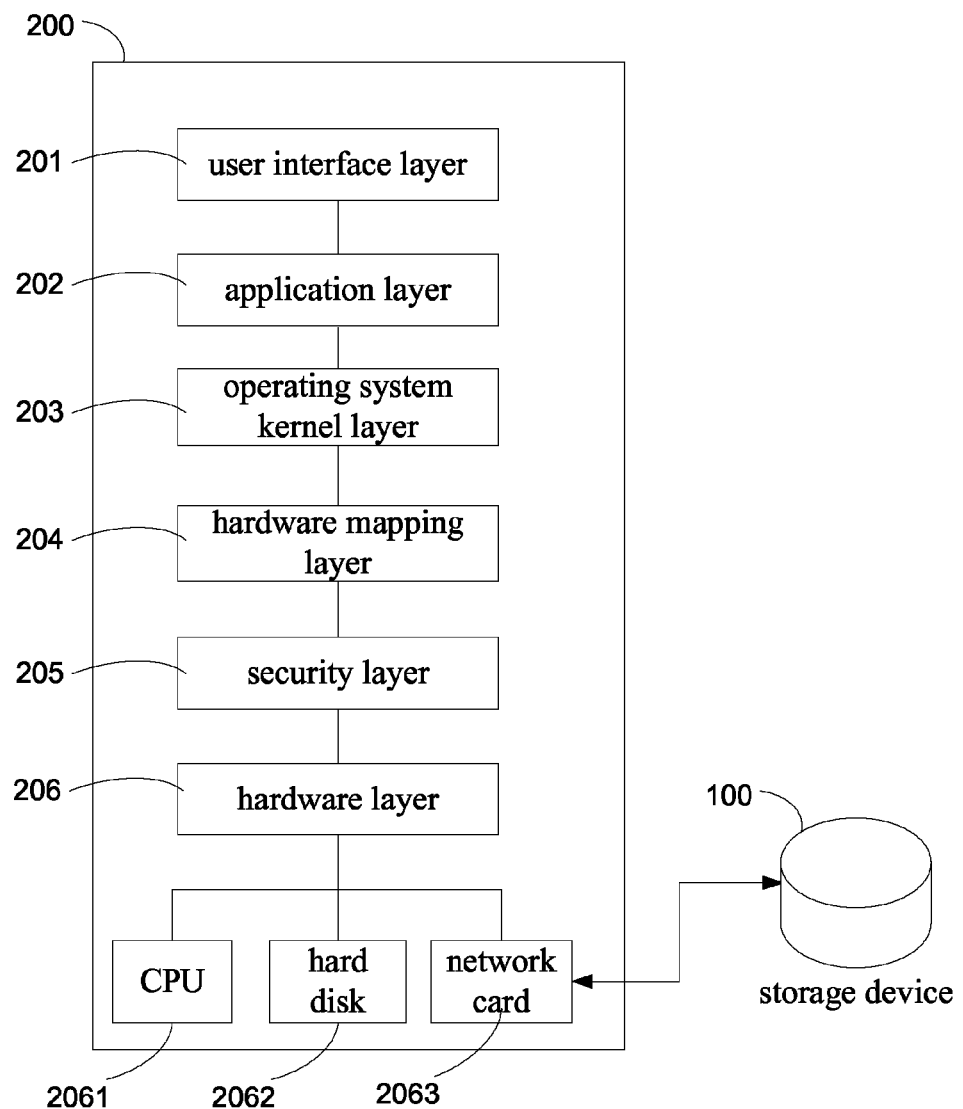
FIG. 8 is a schematic view showing an architect or layers of a computer terminal system provided in a tenth embodiment of the present disclosure.

To solve the above problems, embodiments of the present disclosure will be described in detail with reference to accompanying drawings hereinafter. FIG. 8 is a schematic diagram of a hierarchical structure of a computer terminal system in a tenth embodiment of the present disclosure. A computer terminal system 200 includes a user interface layer 201, an application layer 202, an operating system kernel layer 203, a hardware mapping layer 204, a security layer 205, and a hardware layer 206; and the computer terminal system 200 is coupled to a storage device 100 (i.e. a safety device). The hardware layer 206 includes a CPU 2061, a hard disk 2062 (i.e. a local storage device) and a network card 2063. In this embodiment, the storage device 100 is a remote disk array, which exchanges data with the computer terminal system 200 by connecting with the network card 2063 in hardware layer 206. In other embodiments of the present disclosure, the storage device 100 may also be other types of storage equipment.

Figure 9:
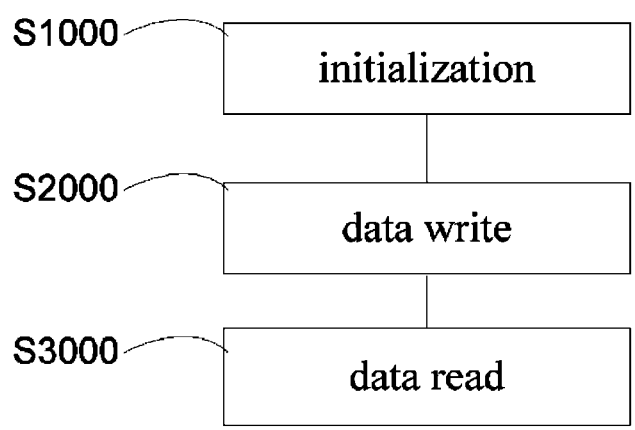
FIG. 9 is a flowchart of a whole process for data dumping provided in the tenth embodiment of the present disclosure.

Referring to the above hierarchical structure and referring to FIG. 9, the data dump process provided by this embodiment includes:

S1000, initialization;

S2000, data write process or data writing process; and

S3000, data read process or data reading process.

In other embodiments, the initialization, data write and data read process can be selectively carried out as required.

Figure 10:
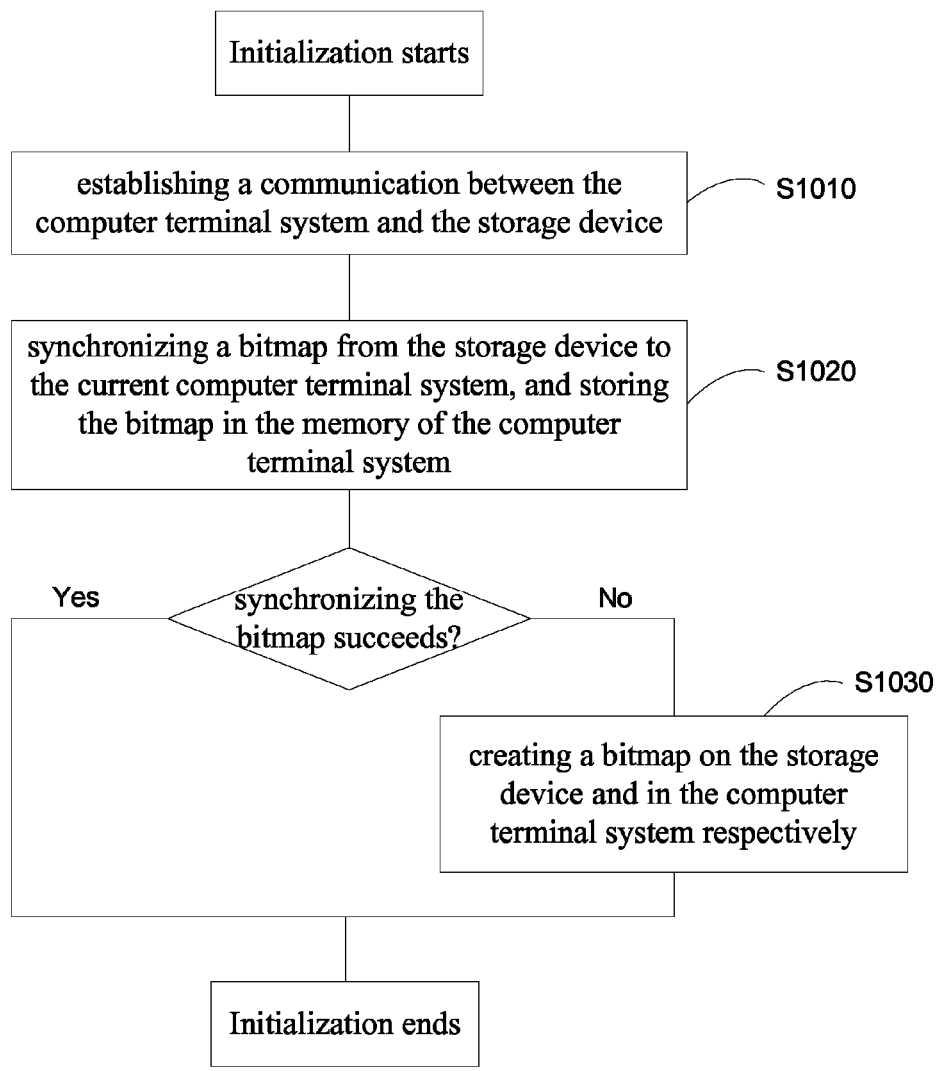
FIG. 10 is a flowchart of an initialization process S1000 in FIG. 10.

Further, referring to FIG. 10, the initialization process S1000 includes:

S1010, establishing a communication between the computer terminal system 200 and the storage device 100 (i.e. safety device); and S1020, synchronizing a bitmap from the storage device 100 to the current computer terminal system 200, and storing the bitmap in the memory of the computer terminal system 200; the bitmap being used to represent whether or not data of local storage address is stored onto the safety device.

To distinguish the bitmap of the computer terminal system 200 from that of the storage device 100, hereinafter, the bitmap of the computer terminal system 200 is, unless otherwise specified, referred to as a first bitmap or bitmap, and the bitmap in the storage device 100 is referred to as a second bitmap.

If synchronizing the second bitmap from the storage device 100 to the current computer terminal system 200 fails, it means that the storage device 100 and the computer terminal system 200 is connected for the first time, or that there was no storage operation in the computer terminal system 200 during the last connection. The initialization process S1000 further includes:

S1030, creating a bitmap on the storage device 100 and in the computer terminal system 200 respectively.

Specifically, first, the local storage space of the computer terminal system is mapped to the storage device 100, where the mapping relation is one-to-one mapping with sector (or other basic unit of storage) as unit, and a bitmap is created. In other embodiments of the present disclosure, other basic unit of storage can be used as unit to establish the bitmap from the local storage space to the storage device 100.

Figure 11:
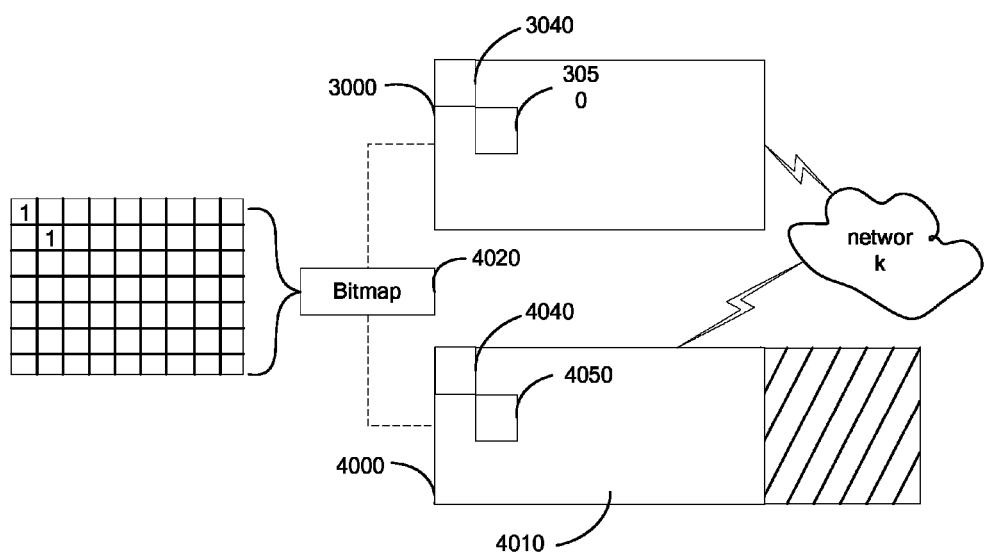
FIG. 11 is a schematic view showing a bitmap provided in the tenth embodiment of the present disclosure.

FIG. 11 is a schematic diagram of the bitmap in this embodiment, FIG. 11 includes a storage medium 3000 on a local storage device (i.e. a hard disk 2062), and a storage medium 4000 on the storage device 100 which is connected to the local storage device through network. For the storage medium 3000, a storage space 4010 having the same size is established on the storage medium 4000, which is used as the one-to-one mapping space. At this time, there is only one bitmap 4020 in the storage space 4010. The bitmap 4020 is a bit map, in which one bit represents one sector and the data (0 or 1) of the bit represents whether or not the corresponding sector of the storage medium 3000 is stored onto the storage space 4010 of the storage medium 4000. In this embodiment, sectors which data is stored onto the storage space 4010 of the storage medium 4000 are marked with 1, and sectors which data is not are marked with 0. After the bitmap 4020 is created, it is synchronized to the computer terminal system 200. When an application or the operating system is to save data, e.g. a file, the file system of the operating system allocates a certain amount of storage space on the storage medium 3000 of the local storage device, e.g. sector 3040 and sector 3050, assigns the storage space to the file, and updates the local file allocation table. When the file is saved onto the storage space 4010 of the storage medium 4000 (i.e. the file is data dumped), bit data of the bitmap corresponding to the sector 3040 and sector 3050 are changed to 1, while sector 4040 and sector 4050 are allocated on corresponding positions on the storage medium 4000 to save the file.

After the initialization process is finished in this embodiment, the computer terminal system 200 and the storage device 100 store two bitmaps with the same data.

Further, the data write process S2000 includes:

S2010, the application layer 202 makes an operation request of writing file through the file system of the operating system kernel layer 203, or the operating system kernel layer 203 makes an operation request of writing file directly; or the application layer 202 makes an operation request of writing data to the hardware mapping layer 204 directly, or the operating system kernel layer 203 makes an operation request of writing data to the hardware mapping layer 204 directly;

S2020, the operating system kernel layer 203 translates the operation request of writing file to hardware port instructions (i.e. hardware instruction), and sends the hardware port instructions to the hardware mapping layer 204, the hardware port instructions containing the storage position (i.e. sector) to be written on; if operation request of writing data is made directly to the hardware mapping layer 204, the request is already a hardware port instruction; and S2030, the security layer 205 modifies the writing position (i.e. sector) in the port instruction to the storage address on the storage device 100, updates the first bitmap by changing the bit data corresponding to the sector to 1 which represents this sector is data dumped; and the security layer 205 then sends the modified port instruction to the hardware layer 206.

After the above processes, the writing process S2000 can further include:

S2040, the first bitmap is synchronized to the storage device 100 and saved as a second bitmap, which guarantees that the first bitmap on the computer terminal system 200 and the second bitmap on the storage device are the same. In other embodiments of the present disclosure, this synchronization operation can be carried out at last, e.g. before the computer terminal system 200 is power off.

After the writing process is carried out, the computer terminal system 200 doesn't store the writing data, since the writing data has been dumped or stored on the storage device 100.

Further, the data read process S3000 includes:

S3010, the second bitmap on the storage device 100 is synchronized to the computer terminal system 200 and saved as the first bitmap;

S3020, the application layer 202 makes an operation request of reading file through the file system of the operating system kernel layer 203, or the operating system kernel layer 203 makes an operation request of reading file directly; or the application layer 202 makes an operation request of reading data to the hardware mapping layer 204 directly, or the operating system kernel layer 203 makes an operation request of reading data to the hardware mapping layer 204 directly; and S3030, the security layer 205 receives a data read instruction from the hardware mapping layer 204, and acquires a read address (or source address) of the data read instruction; if this address is not an address of the storage device 100, the security layer searches the first bitmap, and if the bit data in the first bitmap corresponding to the read address represents that the data of the read address is dumped, the security layer 205 modifies the read address of the port instruction to the corresponding read address of the storage device 100; and the security layer 205 sends the modified port instruction to the hardware layer 206.

In step S3010, synchronizing the second bitmap from the storage device 100 to the computer terminal system 200 is to keep the consistency between the local data and the data on the safety device after the reboot of the computer terminal system 200.

The above read process does not affect the current operation mode of users, and realizes data read operation of the dumped data on the safety device (i.e. the storage device 100).

Figure 12:
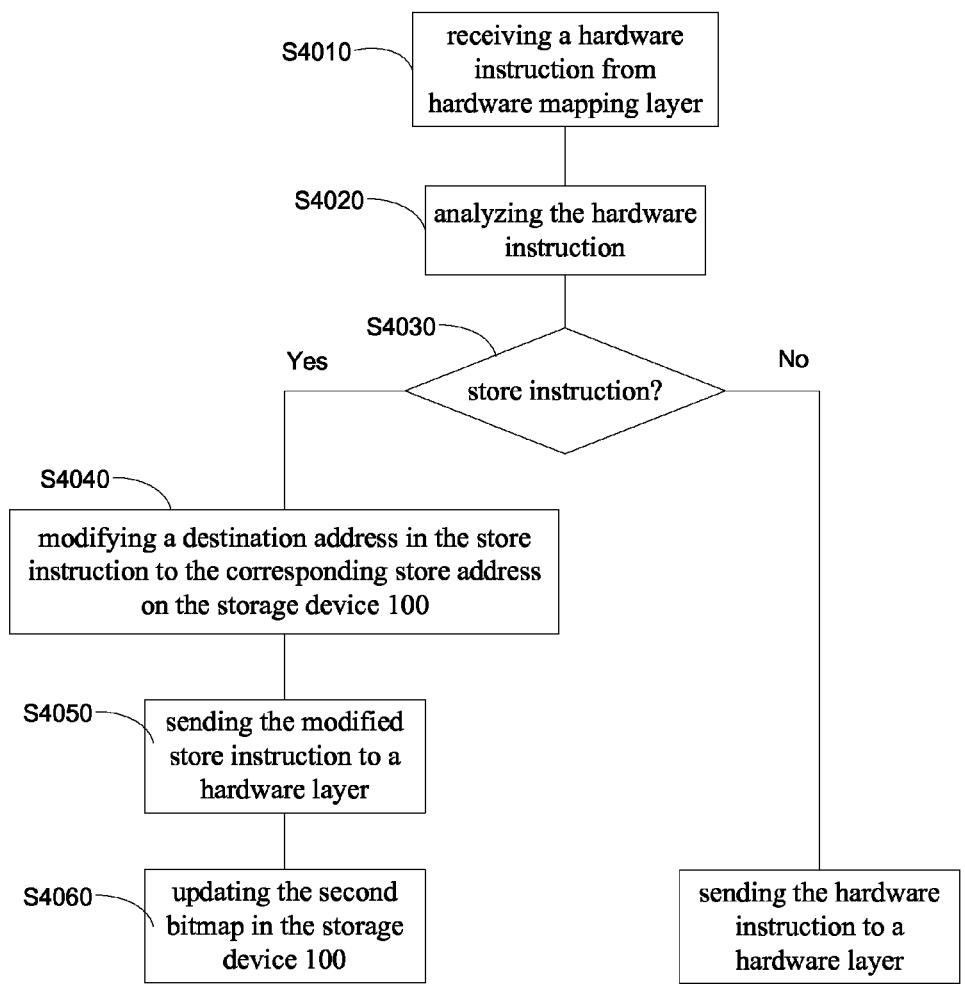
FIG. 12 is a flowchart of a data safety storage method provided in the tenth embodiment of the present disclosure.

Further, based on the above data write process and referring to FIG. 12, a data safety storage method provided in the embodiment includes:

S4010, receiving a hardware instruction;

S4020, analyzing the hardware instruction;

S4030, determining if the hardware instruction is a store instruction;

S4040, if the hardware instruction is a store instruction, modifying a destination address in the store instruction to the corresponding storage address on the storage device 100 (i.e. safety device); and S4050, sending the modified store instruction to a hardware layer.

Specifically, in this embodiment, the operating system running on the computer terminal system is Windows operating system, and in Windows, the hardware mapping layer is hardware abstract layer (HAL). In other embodiments, the operating system running on the computer terminal system can be Linux, UNIX or embedded operating system, and the hardware mapping layer is a layer corresponding to the HAL of Windows.

In step S4010, the hardware instruction is the hardware instruction from hardware mapping layer. Receiving hardware instructions from the hardware mapping layer can fully screen the hardware instructions (i.e. port instructions) sent to the processor such as CPU, which further improves the data security. In other embodiments of the present disclosure, the hardware instruction can also come from the operating system kernel layer or units corresponding to other computer layers.

In addition, together with the runtime instruction recombination method as discussed above, the process of receiving a hardware instruction may include: acquiring a hardware instruction using the runtime instruction recombination method.

In step S4020, there are various instruction analysis mechanisms within the security layer 205 to handle different types of CPU instruction, such as X86 instruction set, ARM instruction set, MIPS instruction set, etc.

In step S4040, after modifying a destination address in the store instruction to the corresponding storage address on the storage device 100, the method can further include: updating the first bitmap by setting the 'bit' of the first bitmap which corresponds to the destination address (sector) to 1.

Further, in step S4040, the method can further include: synchronizing the updated bitmap to the safety device saving as a second bitmap.

In step S4050, the security layer 205 forwards modified or unmodified hardware instructions to the hardware layer 206. In this embodiment, the data-dump operation (which is to save local data onto the safety device) of the security layer 205 is completely transparent to upper layers or users, which does not affect the work flow of current computers or applications.

The methods provided in this embodiment can not only be used in a computer terminal system, but also be used in any computing devices or intelligent terminals that include an application layer, an operating system kernel layer and a hardware layer, which achieves instruction level data dump (i.e. data dump based on hardware store instruction) before the hardware layer carries out instructions.

Figure 13:
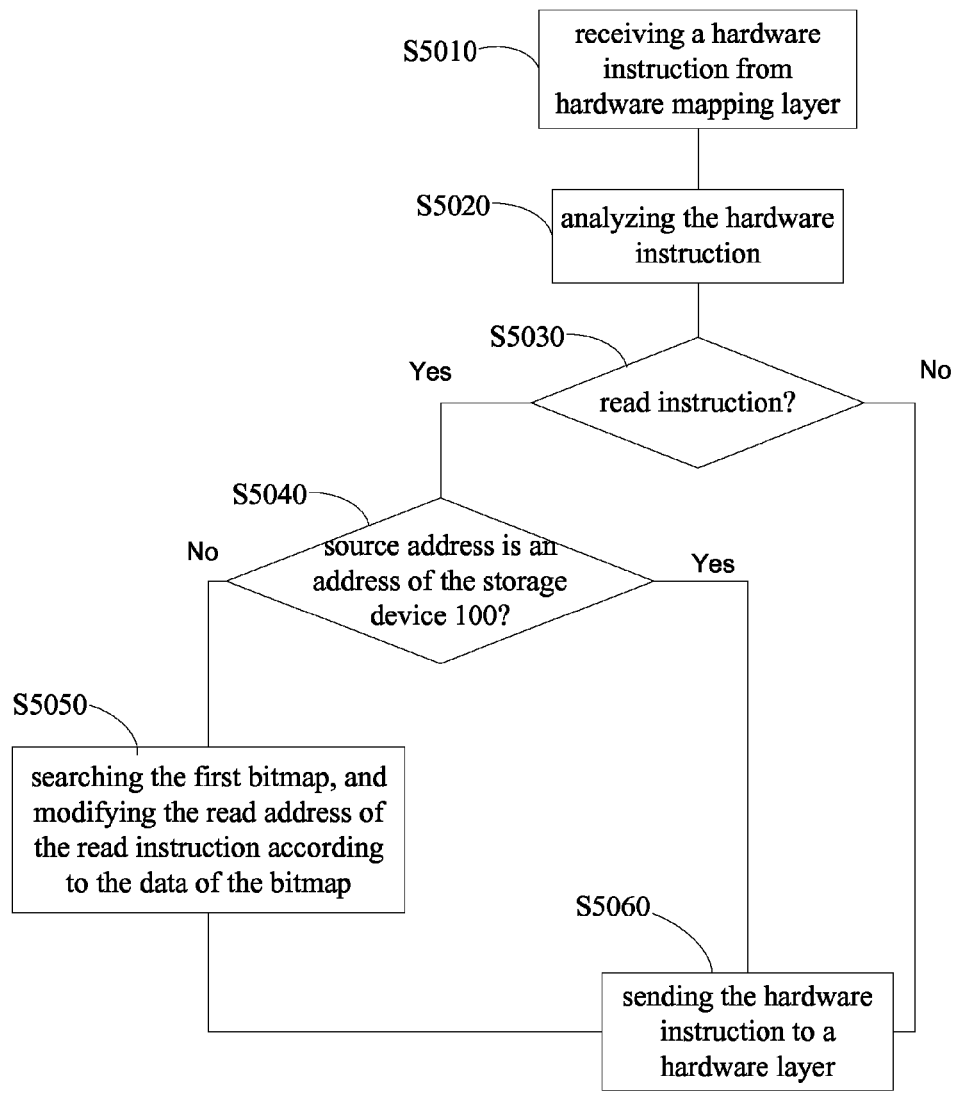
FIG. 13 is a flowchart of a data safety reading method provided in the tenth embodiment of the present disclosure.

According to the above data read process, referring to FIG. 13, a data safety reading method provided in the embodiment includes:

S5010, receiving a hardware instruction;
S5020, analyzing the hardware instruction;
S5030, determining if the hardware instruction is a read instruction;
S5040, if the hardware instruction is a read instruction, acquiring a source address of the read instruction, and determining if the source address is an address of the storage device 100;
S5050, if the source address is not an address of the storage device 100, searching the first bitmap, and modifying the read address of the read instruction according to the data of the bitmap; and
S5060, sending the modified hardware instruction to a hardware layer.

Before the step S5010, the method can further include: S5000, synchronizing a second bitmap on the storage device 100 to the computer terminal system 200 saving as a first bitmap. In the step S5010 of this embodiment, the hardware instruction comes from a hardware mapping layer.

In addition, together with the above runtime instruction recombination method, receiving a hardware instruction may include: acquiring a hardware instruction using the runtime instruction recombination method.

In step S5030, if the hardware instruction is not a read instruction, the security layer 205 directly sends the hardware instruction to the hardware layer for execution.

In step S5040, if the source address is already an address of the storage device 100, the security layer 205 does not have to search the first bitmap but sends the hardware instruction to the hardware layer for execution.

Further, to save network resource, in some embodiments of the present disclosure, the storage device 100 can be shared among a plurality of terminal systems.

Figure 14:
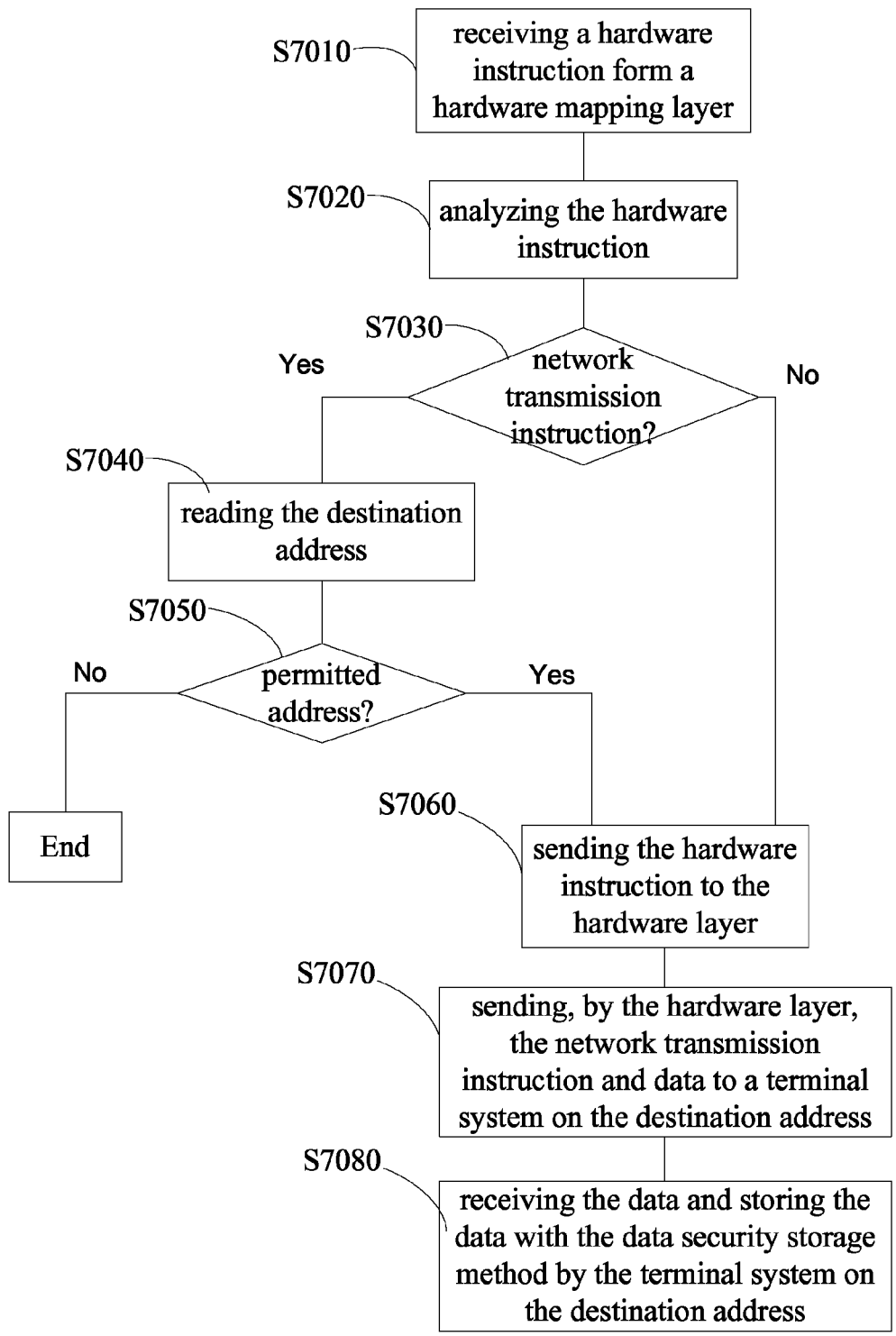
FIG. 14 is a flowchart of a data safety transmission method provided in the eleventh embodiment of the present disclosure.

Further, based on the above data safety storage and data safety reading method, according to the eleventh embodiment of the present disclosure, there is provided a data safety transmission method. As shown in FIG. 14, the data safety transmission method includes:

S7010, receiving a hardware instruction form a hardware mapping layer;
S7020, analyzing the hardware instruction;
S7030, determining if the hardware instruction is a network transmission instruction;
S7040, if the hardware instruction is a network transmission instruction, reading a destination address;
S7050, determining if the destination address is a permitted address;
S7060, if the destination address is a permitted address, sending the hardware instruction to a hardware layer; and if the destination address is not a permitted address, blocking the hardware instruction and the method is finished;
S7070, sending, by the hardware layer, the network transmission instruction and data to a terminal system on the destination address; and
S7080, receiving by the terminal system on the destination address the data, and storing by the terminal system on the destination address the data with the data safety storage method.

In step S7060, if the destination address is not a permitted address, which means that the terminal system on the destination address does not adopt the data safety storage and data safety reading method provided in the present disclosure, it is not allowed to be a destination address for network transmission operation.

Figure 15:
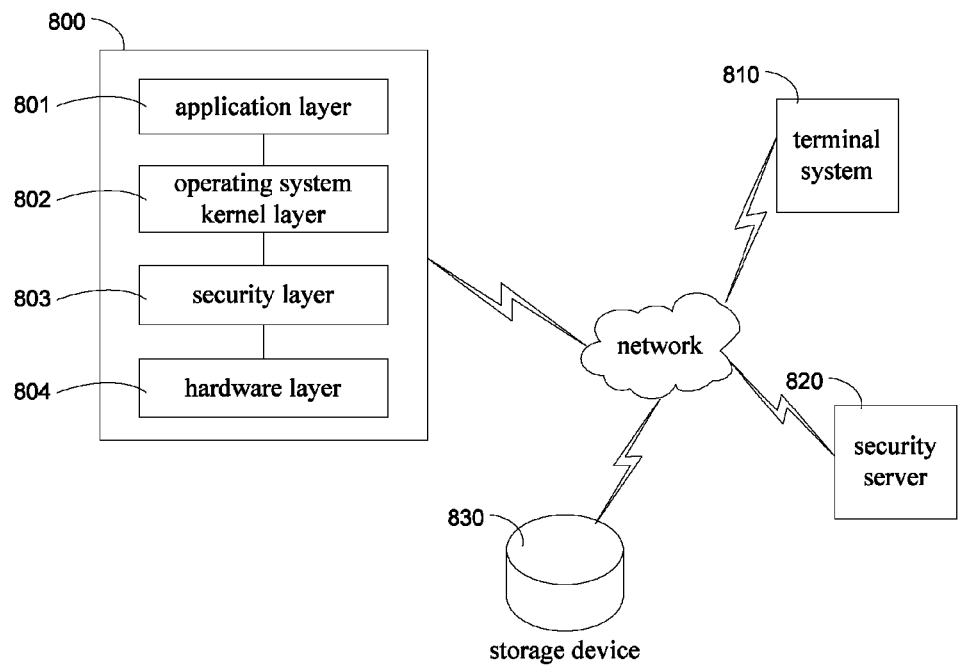
FIG. 15 is a schematic view showing a network structure provided in the eleventh embodiment of the present disclosure.

In step S7050, determining if the destination address is a permitted address is carried out in the following steps. As shown in FIG. 15, a security server 820 is connected with terminal systems 800 and 810 through internet; when the data safety transmission method provided in embodiments of the present disclosure is deployed in the terminal system 800 and 810, the terminal system 800 and 810 carries out a registration operation to the security server 820 automatically; a permitted address table is maintained in the security server 820, which records all registered terminal systems. When the permitted address table is updated, the security server 820 automatically sends the new permitted address table to each terminal. The architecture of the terminal system 800 includes an application layer 801, an operating system kernel layer 802, a security layer 803 and a hardware layer 804, in which the security layer 803 is responsible for maintaining the permitted address table. The security layer 803 determines if the destination address is a permitted address by determining if the destination address is in the permitted address table. That is to say in step S7050, if a destination address is listed in the permitted address table, the destination address is a permitted address.

By the above data safety transmission method, even if Trojan horses or malicious tools acquire confidential information, they cannot transmit the stolen information.

Although methods provided in the present disclosure are described within a computer terminal system, any electronic equipment that can provide file or data editing, saving or transmitting operation, such as handhelds and intelligent terminals, can be the terminal system that applies the data safety storage and transmission method provided in the present disclosure.

In addition, one of ordinary skill in the art can appreciate that the above data safety storage method, data safety reading method and data safety transmission method can be implemented in software or hardware, if in software, the above method steps can be represented in computer code that is stored in computer readable medium, which can also become a software product.

Figure 16:
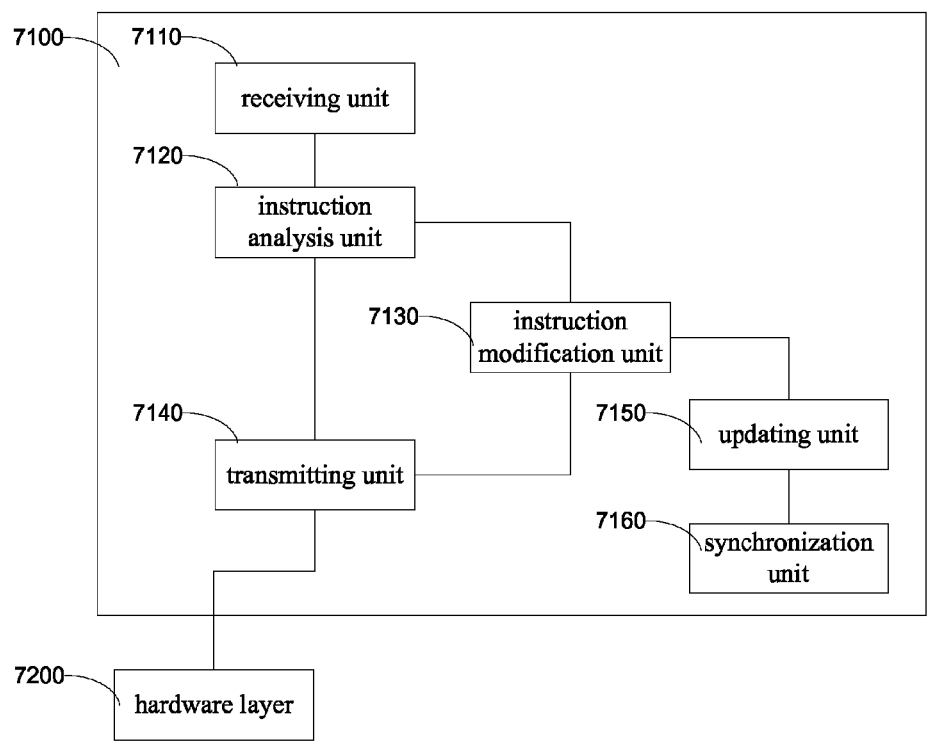
FIG. 16 is a schematic view showing a data safety storage device provided in a twelfth embodiment of the present disclosure.

Corresponding to the above data safety storage method, according to a twelfth embodiment of the present disclosure, there is provided a data safety storage device. Referring to FIG. 16, a data safety storage device 7100 includes: a receiving unit 7110, an instruction analysis unit 7120, an instruction modification unit 7130, and a transmitting unit 7140. The receiving unit 7110 is coupled with the instruction analysis unit 7120, the instruction analysis unit 7120 is also coupled with the instruction modification unit 7130 and the transmitting unit 7140, and the transmitting unit 7140 is also coupled with the instruction modification unit 7130 and the hardware layer 7200.

The receiving unit 7110 is adapted to receive a hardware instruction, and the hardware instruction comes from the hardware mapping layer in this embodiment; the instruction analysis unit 7120 is adapted to analyze the hardware instruction and to determine if the hardware instruction is a store instruction; if the hardware instruction is a store instruction, the instruction modification unit 7130 modifies the destination address of the store instruction to a corresponding storage address on a safety device, and sends the modified store instruction to the transmitting unit 7140; if the hardware instruction is not a store instruction, the instruction analysis unit 7120 sends the hardware instruction directly to the transmitting unit 7140; the transmitting unit 7140 is adapted to send the received instruction to the hardware layer 7200.

Further, the data safety storage device can also include an updating unit 7150 and a synchronization unit 7160, in which the updating unit 7150 is coupled with the instruction modification unit 7130 and the synchronization unit 7160 is coupled with the updating unit 7150.

The updating unit 7150 is adapted to update the bit that corresponds to the destination address in the bitmap after the instruction modification unit 7130 modifies the store instruction. In this embodiment, the 'bit' data which corresponds to the sector at the destination address of the store instruction is set to '1' to represent that the sector is data dumped.

The synchronization unit 7160 is adapted to establish the communication between the computer terminal system and the safety device, and to perform synchronization operation of the bitmap between the computer terminal system and the safety device. Specifically, when the computer terminal system starts up, the synchronization unit 7160 establishes the communication between the computer terminal system and the safety device, and synchronizes a second bitmap of the safety device to the computer terminal system saving as a first bitmap.

If it fails to synchronize the second bitmap on the safety device to the computer terminal system, it means that this is the first communication between the computer terminal system and the safety device, then the synchronization unit 7160 maps the local storage space of the computer terminal system to the safety device and creates a first bitmap and a second bitmap. In this embodiment, the second bitmap on the safety device is built firstly and is then synchronized to the computer terminal system saving as the first bitmap.

When the updating unit 7150 updates the bit that corresponds to the destination address in the first bitmap, the synchronization unit 7160 sends the updated first bitmap to the safety device, which is then saved as a second bitmap.

In this embodiment, the safety device is a remote storage device, and may be shared among multiple computer terminal systems. The hardware instruction is a hardware port I/O instruction.

Figure 17:
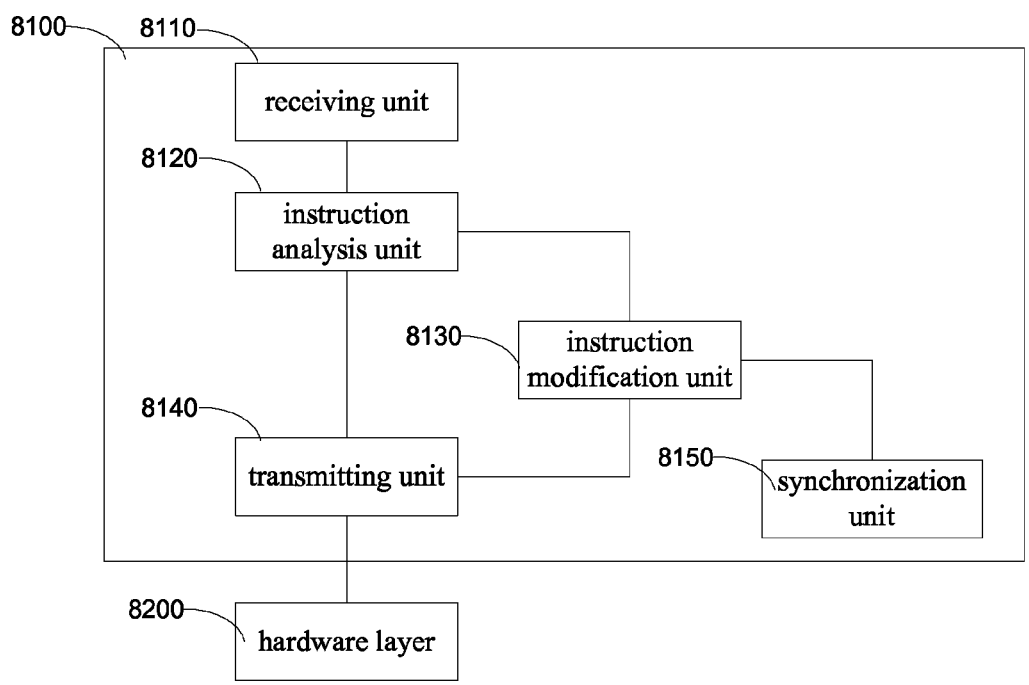
FIG. 17 is a schematic view showing a data safety reading device provided in a thirteenth embodiment of the present disclosure.

Further, corresponding to the data safety reading method as discussed above, according to a thirteenth embodiment of the present disclosure, there is provided a data safety reading device. Referring to FIG. 17, a data safety reading device 8100 includes: a receiving unit 8110, an instruction analysis unit 8120, an instruction modification unit 8130 and a transmitting unit 8140. The receiving unit 8110 is coupled with the instruction analysis unit 8120, the instruction analysis unit 8120 is also coupled with the instruction modification unit 8130 and the transmitting unit 8140 respectively, and the instruction modification unit 8130 is also coupled with the transmitting unit 8140. The transmitting unit 8140 is coupled with the hardware layer 8200.

The receiving unit 8110 is adapted to receive a hardware instruction, and the hardware instruction comes from the hardware mapping layer in this embodiment. The instruction analysis unit 8120 is adapted to analyze the hardware instruction and to determine if the hardware instruction is a read instruction, and if the hardware instruction is a read instruction, the instruction analysis unit 8120 is also adapted to acquire the source address of the read instruction and determine if the source address is an address on the safety device. If the hardware instruction is not a read instruction or the source address is an address on the safety device, the instruction analysis unit 8120 sends the hardware instruction to the transmitting unit 8140. If the source address is not an address on the safety device, the instruction modification unit 8130 looks up the bitmap, and modifies the read address of the read instruction according to the data of the bitmap. Similar to the above bitmap, the bitmap in this embodiment is used to represent whether or not data of local storage address is saved or data dumped onto the safety device. Specifically, the instruction modification unit 8130 searches for the bit that corresponds to the sector at the source address in the first bitmap. If the 'bit' data shows 1, it means that data dump has been performed; if the 'bit' data shows 0, it means that data dump has not been performed. If data dump has been performed, the instruction modification unit 8130 modifies the source address (or read address) to a corresponding data dump address, and sends the modified hardware instruction to the transmitting unit 8140.

Further, the data safety reading device may also include a synchronization unit 8150. The synchronization unit 8150 is coupled with the instruction modification unit 8130. And the synchronization unit 8150 is adapted to establish a communication between the computer terminal system and the safety device, and to synchronize bitmaps between the computer terminal system and the safety device. Specifically, when the computer terminal system starts up, the synchronization unit 8150 establishes the communication between the computer terminal system and the safety device, and synchronizes a second bitmap of the safety device to the computer terminal system, which is saved as a first bitmap and to be used by the instruction modification unit 8130.

In this embodiment, the safety device is a remote storage device which may be shared among multiple computer terminal systems. In other embodiments of the present disclosure, the safety device may be a local storage device.

One of ordinary skill in the art would appreciate that the above method used in the security layer may also be used in various layers from the operating system kernel layer to the hardware layer. Various modifications can be made to choose different layer to implement the above method or device provided by the present disclosure without departing from the scope of spirit of the disclosure.

Data safety storage method and device provided in the present disclosure are described in detail in the above embodiments; compared with the conventional art, the method and device have the following advantages: 1. the data safety storage method achieves an instruction level data dump which is a full data dump, and achieves data safety storage during the full operation time of a computer terminal system based on the full data dump; on the one hand, even if Trojan horses or malicious tools have acquired confidential information, they cannot save the stolen data, which guarantees that data are in security zone under control, on the other hand, no confidential information or data is saved locally, which prevents secret-related personnel from divulging secrets actively or passively; 2. By receiving hardware instructions from the hardware mapping layer, it can screen instructions 100%, which further improves data security.

Data safety reading method and device provided in the present disclosure are described in detail in the above embodiments; compared with the conventional art, the method and device has the following advantages: 1. together with the data safety storage method, the data safety reading method guarantees that all data are in security zone under control, and that dumped data can be accessed or read; and since no confidential information or data is saved locally, it prevents secret-related personnel from divulging secrets actively or passively; 2. when the safety device is a remote storage device, it may be shared by multiple terminals, which improves space use efficiency of the safety device.

In other embodiments of the present disclosure, the above method used in the security layer may also be implemented in various layers from the bottom layer of the operating system to the upper layer of the hardware layer. One of ordinary skill in the art would appreciate that various modifications can be made to choose a different layer to implement the above methods or devices provided in the embodiments of the present disclosure without departing from the scope of spirit of the disclosure.

The above are only specific embodiments of the disclosure which are used to make those skilled in the art better understand the spirit of the disclosure, however, the scope of protection of the disclosure should not be limited to the specific descriptions of the specific embodiments, various modifications can be made to the specific embodiments of the disclosure by those skilled in the art without departing from the scope of spirit of the disclosure.

What is claimed is:

1. A runtime instruction recombination method, comprising:
    storing an instruction execution context;
    searching an address corresponding table according to a value of an address register in the instruction execution context, the address corresponding table being used to show whether or not a machine instruction segment to be recombined has a stored recombined instruction segment;
    if a record in the address corresponding table is found, modifying the value of the address register to the value of the record, and restoring the instruction execution context, wherein the address register's value is updated;
    if no record in the address corresponding table is found, acquiring a machine instruction segment to be scheduled, inserting a second control transfer instruction before the last instruction of the machine instruction segment to be scheduled, the second control transfer instruction pointing to an entry address of an instruction recombination platform, which generates a recombined instruction segment, modifying the value of the address register in the instruction execution context to an address of the recombined instruction segment, and creating a record in the address corresponding table with the address of the recombined instruction segment and the value of the address register before update; and restoring the instruction execution context, wherein the address register's value is updated.

2. A runtime instruction recombination method, comprising:
    storing an instruction execution context;
    acquiring a machine instruction segment to be scheduled;
    analyzing the machine instruction segment by using an instruction set to identify the machine instruction segment, in order to acquire a target machine instruction to be processed;
    modifying the target machine instruction in a preset way;
    inserting a second control transfer instruction before the last instruction of the target machine instruction, the second control transfer instruction pointing to an entry address of an instruction recombination platform, which generates a recombined instruction segment, and modifying value of an address register in the instruction execution context to an address of the recombined instruction segment; and
    restoring the instruction execution context, wherein the address register's value is updated,
    where if the target machine instruction is a store or read instruction, modifying the target machine instruction in a preset way comprises modifying a store or read address of the store or read instruction to a corresponding address on a safety device; if the target machine instruction is an I/O instruction, modifying the target machine instruction in a preset way comprises blocking input instructions in the I/O instruction; or if the target machine instruction is a network transmission instruction, modifying the target machine instruction in a preset way comprises: determining if a destination address of the network transmission instruction which corresponds to a remote computing device is a permitted address, and if the destination address is not a permitted address, blocking the network transmission instruction.

3. A runtime instruction recombination method, comprising:
    storing an instruction execution context;
    acquiring a machine instruction segment to be scheduled;
    disassembling the machine instruction segment into an assembly instruction segment;
    inserting a second control transfer instruction before the last instruction of the assembly instruction segment, which generates a recombined assembly instruction segment, the second control transfer instruction pointing to an entry address of an instruction recombination platform;
    assembling the recombined assembly instruction segment to get a recombined machine instruction segment; modifying value of an address register in the instruction execution context to the address of the recombined assembly instruction segment; and
    restoring the instruction execution context, wherein the address register's value is updated.

4. A runtime instruction recombination device, comprising:
    an instruction execution context store and restore unit, being adapted to store and restore an instruction execution context;
    an instruction acquiring unit, being adapted to acquire a machine instruction segment to be scheduled, after the instruction execution context store and restore unit stores the instruction execution context;
    an instruction recombination unit, being adapted to analyze and modify the machine instruction segment to be scheduled, to generate a recombined instruction segment;
    an instruction replacing unit, being adapted to modify a value of an address register in the instruction execution context to the address of the recombined instruction segment; and
    an instruction searching unit, being adapted to search an address corresponding table according to the value of the address register in the instruction execution context; the address corresponding table being used to show whether or not a machine instruction segment to be recombined has a stored recombined instruction segment,
    where if a record in the address corresponding table is found, the instruction searching unit being adapted to call the instruction replacing unit to modify the value of the address register to the value of the record; and if no record in the address corresponding table is found, the instruction searching unit being adapted to create a record in the address corresponding table using the address of the recombined instruction segment and the value of the address register before update.

5. A runtime instruction recombination device, comprising:
an instruction execution context store and restore unit, being adapted to store and restore an instruction execution context;
an instruction acquiring unit, being adapted to acquire a machine instruction segment to be scheduled, after the instruction execution context store and restore unit stores the instruction execution context;
an instruction recombination unit, being adapted to analyze and modify the machine instruction segment to be scheduled, to generate a recombined instruction segment, where the instruction recombination unit comprises an instruction analysis unit, being adapted to identify the machine instruction segment by using an instruction set and to acquire a target machine instruction that is to be processed, and an instruction modification unit, being adapted to modify the target machine instruction in a preset way; and
an instruction replacing unit, being adapted to modify a value of an address register in the instruction execution context to the address of the recombined instruction segment,
where if the target machine instruction is a store or read instruction, the instruction modification unit is adapted to modify a store or read address of the store or read instruction to a corresponding address on a safety device; if the target machine instruction is an I/O instruction, the instruction modification unit is adapted to block input instructions in the I/O instruction; or if the target machine instruction is a network transmission instruction, the instruction modification unit is adapted to determine if a destination address of the network transmission instruction which corresponds to a remote computing device is a permitted address, and if the destination address is not a permitted address, the instruction modification unit is adapted to block the network transmission instruction.

6. A runtime instruction recombination device, comprising:
an instruction execution context store and restore unit, being adapted to store and restore an instruction execution context;
an instruction acquiring unit, being adapted to acquire a machine instruction segment to be scheduled, after the instruction execution context store and restore unit stores the instruction execution context;
a disassembling unit, being adapted to disassemble the machine instruction segment to be scheduled, which generates an assembly instruction segment to be scheduled;
an instruction recombination unit, being adapted to analyze and modify the assembly instruction segment to be scheduled, to generate a recombined assembly instruction segment;
an assembling unit, being adapted to assemble the recombined assembly instruction segment, which generates a recombined machine instruction segment; and an instruction replacing unit, being adapted to modify a value of an address register in the instruction execution context to the address of the recombined machine instruction segment.

7. The runtime instruction recombination method of claim 1, wherein acquiring a machine instruction segment to be scheduled includes:
reading an address of a machine instruction to be scheduled from a CPU address register; and
reading a machine instruction segment according to the address of a machine instruction to be scheduled, the last instruction of the machine instruction segment being a control transfer instruction.

8. The runtime instruction recombination method of claim 7, wherein reading a machine instruction segment according to the address of a machine instruction to be scheduled includes:
searching machine instructions corresponding to the address of the machine instruction to be scheduled, until a first control transfer instruction is found; the control transfer instruction including JMP instruction and CALL instruction.

9. The runtime instruction recombination method of claim 1, wherein before inserting a second control transfer instruction, the method further comprises:
analyzing the machine instruction segment by using an instruction set to identify the machine instruction segment, in order to acquire a target machine instruction to be processed; and
modifying the target machine instruction in a preset way.

10. The runtime instruction recombination method of claim 2, wherein acquiring a machine instruction segment to be scheduled includes:
reading an address of a machine instruction to be scheduled from a CPU address register; and
reading a machine instruction segment according to the address of a machine instruction to be scheduled, the last instruction of the machine instruction segment being a control transfer instruction.

11. The runtime instruction recombination method of claim 10, wherein reading a machine instruction segment according to the address of a machine instruction to be scheduled includes:
searching machine instructions corresponding to the address of the machine instruction to be scheduled, until a first control transfer instruction is found; the control transfer instruction including JMP instruction and CALL instruction.

12. The runtime instruction recombination method of claim 2, wherein after storing an instruction execution context and before acquiring a machine instruction segment to be scheduled, the method further comprises:
searching an address corresponding table according to the value of the address register, the address corresponding table being used to show whether or not a machine instruction segment to be recombined has a stored recombined instruction segment; and
if a record in the address corresponding table is found, modifying the value of the address register to the value of the record, and restoring the instruction execution context, wherein the address register's value is updated.

13. The runtime instruction recombination device of claim 4, wherein the instruction acquiring unit is adapted to read an address of a machine instruction to be scheduled from a CPU address register, and adapted to read the machine instruction segment to be scheduled according to the address of the machine instruction, the last instruction of the machine instruction segment being a control transfer instruction.

14. The runtime instruction recombination device of claim 4, wherein the instruction recombination unit includes:
   an instruction analysis unit, being adapted to identify the machine instruction segment by using an instruction set and to acquire a target machine instruction that is to be processed; and
   an instruction modification unit, being adapted to modify the target machine instruction in a preset way.

15. The runtime instruction recombination device of claim 5, wherein the instruction acquiring unit is adapted to read an address of a machine instruction to be scheduled from a CPU address register, and adapted to read the machine instruction segment to be scheduled according to the address of the machine instruction, the last instruction of the machine instruction segment being a control transfer instruction.

16. The runtime instruction recombination device of claim 6, wherein the instruction acquiring unit is adapted to read an address of a machine instruction to be scheduled from a CPU address register, and adapted to read the machine instruction segment to be scheduled according to the address of the machine instruction, the last instruction of the machine instruction segment being a control transfer instruction.

17. The runtime instruction recombination device of claim 6, wherein the instruction recombination unit includes:
   an instruction analysis unit, being adapted to identify the machine instruction segment by using an instruction set and to acquire a target machine instruction that is to be processed; and
   an instruction modification unit, being adapted to modify the target machine instruction in a preset way.

* * * * *